(12) United States Patent
Kiso et al.

(10) Patent No.: US 7,710,644 B2
(45) Date of Patent: May 4, 2010

(54) METHOD FOR PRODUCING MOLD FOR USE IN DUPLICATING LIGHT DIFFUSION SHEET, LIGHT DIFFUSION SHEET AND METHOD FOR PRODUCING THE SAME, AND SCREEN

(75) Inventors: Hiroyuki Kiso, Miyagi (JP); Takao Kudo, Miyagi (JP); Hirokazu Odagiri, Tokyo (JP); Tsutomu Nagahama, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/038,114

(22) Filed: Feb. 27, 2008

(65) Prior Publication Data

US 2008/0151556 A1    Jun. 26, 2008

Related U.S. Application Data

(62) Division of application No. 11/049,013, filed on Feb. 2, 2005, now Pat. No. 7,359,118.

(30) Foreign Application Priority Data

Feb. 4, 2004    (JP)  .............................. 2004-027898
Jan. 28, 2005   (JP)  .............................. 2005-021939

(51) Int. Cl.
  *G03B 21/56*   (2006.01)
  *G02B 7/00*    (2006.01)
  *B22C 3/00*    (2006.01)
  *B05D 1/36*    (2006.01)
  *B24C 5/04*    (2006.01)
  *B24C 3/00*    (2006.01)

(52) U.S. Cl. ...................... 359/443; 359/896; 359/900; 427/134; 427/204; 451/90; 451/102

(58) Field of Classification Search ................. 359/443, 359/900, 896; 427/134, 204; 451/75, 90, 451/102
See application file for complete search history.

(56) References Cited

U.S. PATENT DOCUMENTS

| 4,053,208 | A |   | 10/1977 | Kato et al. |
| 4,083,626 | A |   | 4/1978  | Miyahara et al. |
| 4,232,939 | A |   | 11/1980 | Kikuchi |
| 4,533,568 | A | * | 8/1985  | McClinton et al. .......... 427/135 |
| 5,361,163 | A |   | 11/1994 | Matsuda et al. |
| 5,477,025 | A | * | 12/1995 | Everett et al. .......... 219/121.84 |
| 5,903,392 | A |   | 5/1999  | Kojima et al. |
| 6,894,835 | B2 |  | 5/2005  | Ohsako et al. |
| 7,016,111 | B2 |  | 3/2006  | Chubachi et al. |
| 7,054,063 | B2 |  | 5/2006  | Shimoda |
| 7,139,123 | B2 |  | 11/2006 | Chubachi et al. |

* cited by examiner

*Primary Examiner*—Georgia Y Epps
*Assistant Examiner*—Magda Cruz
(74) *Attorney, Agent, or Firm*—Sonnenschein Nath & Rosenthal LLP

(57) ABSTRACT

A method of producing a mold for use in duplicating a light diffusion sheet is provided. The method includes a step of conducting sand blasting for blasting abrasive material from a blast gun to a surface of a mold base material to form unevenness in the surface of the mold base material, wherein the abrasive material is blasted to the surface of the mold base material at a blast angle of less than 90°.

4 Claims, 11 Drawing Sheets

F I G. 1 2A
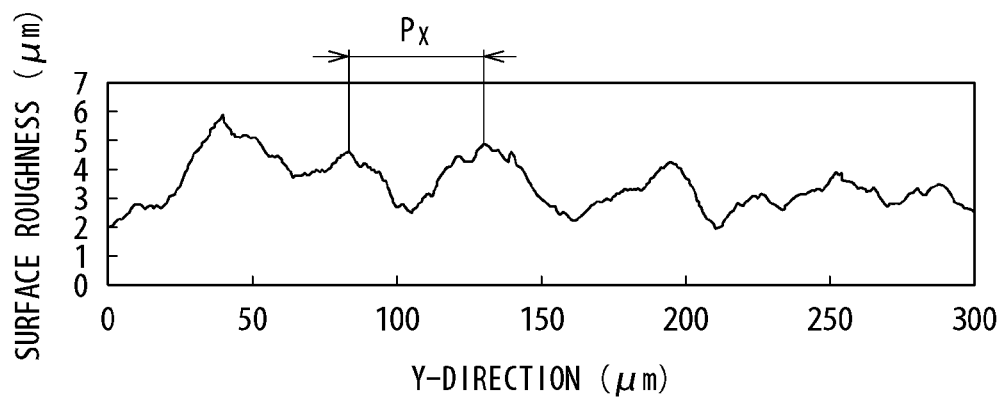
F I G. 12 B
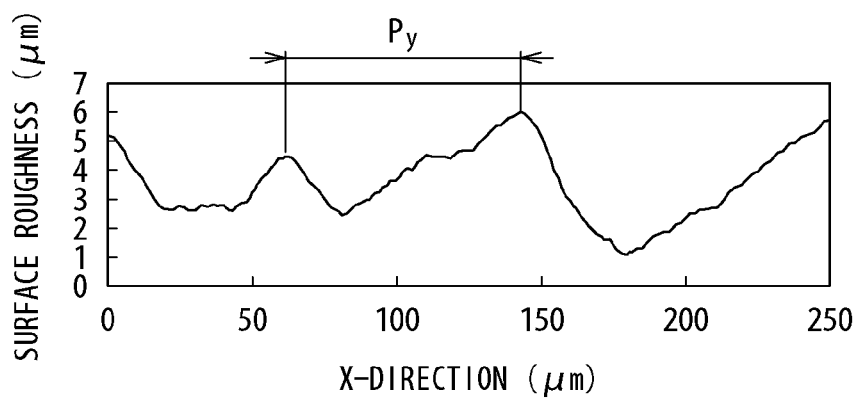

F I G. 1 4 A
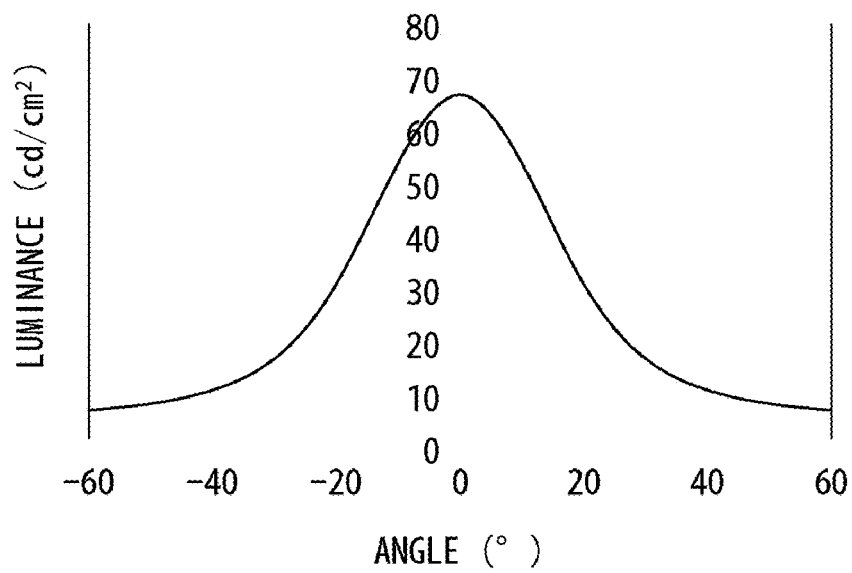
Y-DIRECTION DIFFUSION PROPERTIES
F I G. 1 4 B
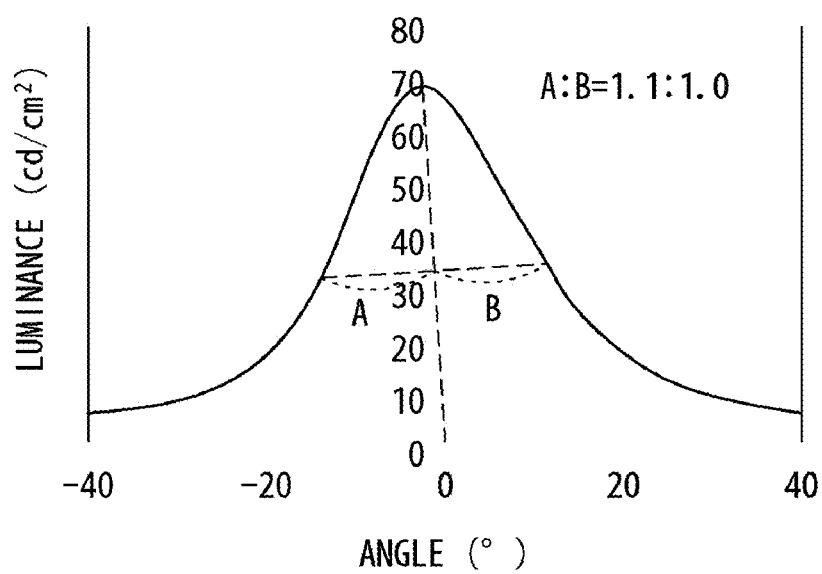
X-DIRECTION DIFFUSION PROPERTIES

Y-DIRECTION DIFFUSION PROPERTIES

X-DIRECTION DIFFUSION PROPERTIES

Y-DIRECTION DIFFUSION PROPERTIES

X-DIRECTION DIFFUSION PROPERTIES

PROJECTION FROM CEILING

PROJECTION FROM FLOOR OR DESK

METHOD FOR PRODUCING MOLD FOR USE IN DUPLICATING LIGHT DIFFUSION SHEET, LIGHT DIFFUSION SHEET AND METHOD FOR PRODUCING THE SAME, AND SCREEN

RELATED APPLICATION DATA

This application is a divisional of U.S. patent application Ser. No. 11/049,013, filed Feb. 2, 2005, the entirety of which is incorporated herein by reference to the extent permitted by law. The present invention claims priority to Japanese Patent Application Nos. 2004-027898 filed in the Japanese Patent Office on Feb. 4, 2004, and 2005-021939 filed in the Japanese Patent Office on Jan. 28, 2005, the entirety both of which are also incorporated by reference herein to the extent permitted by law.

BACKGROUND OF THE INVENTION

1. Field of the Invention

The present invention relates to a method for producing a mold for use in duplicating a light diffusion sheet, a light diffusion sheet and a method for producing the same, and a screen.

2. Description of the Related Art

In recent years, as means of presenting materials in a meeting and the like, over head projectors and slide projectors are widely used. Further, video projectors and moving picture film projectors using liquid crystal for home use are being spread. A projection method in these projectors is such that light emitted from a light source is modulated by, for example, a transmissive liquid-crystal panel to form image light, and the image light is projected on a screen through optics, such as a lens.

For example, a projector apparatus, which can form a color image on a screen, includes a lighting optical system which splits a ray of light emitted from a light source into rays of red (R) light, green (G) light, and blue (B) light and converges the individual rays of light to predetermined optical paths, a liquid-crystal panel (light valve) which modulates individually the light fluxes of RGB colors split by the lighting optical system, and a light combining part which combines the light fluxes of RGB colors modulated by the liquid-crystal panel, and the color image combined by the light combining part is magnified by means of a projection lens and projected on a screen.

Further, recently, there has been developed a projector apparatus of a type spatially modulating the light fluxes of RGB colors using a narrow-band three primary-color light source as a light source and using a grating light valve (GLV) instead of the liquid-crystal panel.

In the above-mentioned projector apparatuses, a screen for projector is used for viewing the projected image. The screen for projector is roughly classified into a screen for front projector such that image light is projected from the front side of the screen to see the reflected light of the projected light by the screen, and a screen for rear projector such that image light is projected from the back side of the screen to see the transmitted light through the screen from the front side of the screen. The screens of any types are required to have excellent recognizability and a large viewing angle.

For this reason, in the screens of any types, typically, a light diffusion sheet for scattering light is formed on the surface of the screen, and the light diffusion sheet makes image light be uniformly diffused and emitted from the entire effective region of the screen.

As a method for producing a light diffusion sheet, there have been a method in which a speckle pattern, which is caused when a roughened surface is illuminated a coherent light flux, is formed in a photosensitive resin to produce a light diffusion sheet (see, for example, Japanese Patent Application Publications S53-51755 and 2001-100621), a method in which a mask is prepared and burned on a photosensitive resin to produce a light diffusion sheet, and a method in which the surface of a mold base material, such as a metal or a resin, is directly ground by mechanical processing to prepare a mold having a finely uneven surface formed, and the surface form of the mold is transferred to an ultraviolet curing resin or the like to produce a light diffusion sheet.

In addition, there have been a method in which a composition including resin particles dispersed in a resin binder is applied to a transparent substrate to produce a light diffusion sheet, and a method in which a mold having an uneven surface is prepared by subjecting a mold base material to sandblasting, and the surface form of the mold is transferred to an ultraviolet curing resin or the like to produce a light diffusion sheet (see, for example, Japanese Patent Application Publication 2000-284106).

By the way, the light diffusion sheet is frequently required to have properties such that the light diffused by the light diffusion sheet is directed to a desired range, namely, the diffusion angle in the longitudinal direction is different from the diffusion angle in the lateral direction. In the production of the light diffusion sheet, a method in which a speckle interference or mask pattern is transferred to a photosensitive resin has been employed.

SUMMARY OF THE INVENTION

However, in the method in which a speckle interference or mask pattern is burned on a photosensitive resin to produce a light diffusion sheet, when a plurality of light diffusion sheets are produced, a mold for duplicating a light diffusion sheet from the photosensitive resin must be prepared, and the exposure of the photosensitive resin requires an exposure time as long as several hours to several days per $m^2$. Further, after the exposure, a step for duplicating a light diffusion sheet using the photosensitive resin, a step for imparting electrical conduction, a step for electroforming, and the like are needed, and thus a considerably prolonged time and high cost are required in the production of the mold for light diffusion sheet.

In the method in which a light diffusion sheet is produced using a mold prepared by mechanically grinding the surface of a mold base material, there are drawbacks in that the precision of grinding is not yet satisfactory, the tools are damaged during the grinding, a very long time is required for the grinding, and the facility for the grinding is large.

On the other hand, in the method in which a light diffusion sheet is produced using a mold prepared by sandblasting, a long time or high cost is not required for the production of the mold, but the light diffused by the light diffusion sheet produced by this method is typically isotropic in the longitudinal direction and in the lateral direction, and therefore it is difficult to control the diffusion angles in the longitudinal and lateral directions so that the diffused light is directed to a range having a rectangular form having long sides in the lateral direction or an elliptical form. This drawback is also found in the method in which a composition including resin particles dispersed in a resin binder is applied to a transparent substrate to produce a light diffusion sheet.

In a screen for front projector of related art, the diffusion property of the screen is uniform over the entire surface, and therefore, the higher the screen gain, the larger the difference in luminance between the middle portion and the periphery portion of the screen, and hence the image on the middle portion of the screen is bright, but the image on the periphery portion is dim. This tendency is also seen in a screen for rear projector.

For example, in the screen for front projector, typically, image display is achieved by a method of forward and downward projection at an angle from a front projector (projection apparatus) fitted to a ceiling, or a method of forward and upward projection at an angle from a front projector placed on a desk or a floor. In this case, when the screen for front projector includes a isotropic diffusion sheet or anisotropic diffusion sheet of related art, a drawback arises in that the maximum luminance of the image light is not directed to a viewer as shown in FIG. 17.

On the other hand, in a display including a rear projector (rear projection apparatus) and a transmissive screen, the level of the uppermost part of the screen and the level of the line of sight of a sitting viewer are the same, and therefore a drawback occurs in that the image on the lower part of the screen is dim as shown in FIG. 18.

Accordingly, it is desirable to provide a method for producing a mold for use in duplicating a light diffusion sheet, and/or a method for producing a light diffusion sheet, which can produce at a low cost a light diffusion sheet having diffusion angles wherein the diffusion angle in the longitudinal direction is different from the diffusion angle in the lateral direction during light transmission or reflection, or having anisotropy in the diffusion properties in the longitudinal and lateral directions. Further, it is desirable to provide a light diffusion sheet produced by the method and/or a screen using the light diffusion sheet. The present invention is made in view of the above drawbacks and issues associated with the techniques of related art.

Inventors of the present application have found that the related art method for producing a mold for use in duplicating a light diffusion sheet using sandblasting has a drawback in the fact that abrasive material is blasted in the direction substantially perpendicular to the surface of a mold base material for grinding the surface with high efficiency. That is, this method forms, in the surface of the mold base material, an isotropic roughness in the longitudinal and lateral directions, and cannot produce a mold for duplicating a light diffusion sheet having diffusion angles wherein the diffusion angle in the longitudinal direction is different from the diffusion angle in the lateral direction. For solving or alleviating the drawback, the present inventors have carefully consider the method of blasting the abrasive material to the surface of the mold base material in the sandblasting and have made extensive and intensive studies on the method, thereby coming to conceive of the present invention.

Further, the inventors of the present application have found that a cause of the drawback in that there is a difference in luminance between the middle portion and the periphery portion of the screen resides in that, at the middle portion of the screen, the incident angle of the projector light is 0° and part of the reflected light having the largest quantity of light is reflected toward a viewer, whereas, at the periphery portion of the screen, the incident angle of the projector light is not 0° and part of the reflected light having the largest quantity of light is reflected toward the outside of the screen, and thus only part of the reflected light having small quantity of light is reflected toward the viewer in front of the screen. The present inventors have made extensive and intensive studies based on these findings obtained by the studies on the method of blasting the abrasive material to the surface of the mold base material in the sandblasting. Accordingly, the present embodiment is made to solve or alleviate the drawback.

According to an embodiment of the present invention, there is provided a method for producing a mold for use in duplicating a light diffusion sheet, the method including a step of conducting sandblasting for blasting abrasive material from a blast gun to the surface of a mold base material to form unevenness or roughness in the surface of the mold base material, wherein the abrasive material is blasted to the surface of the mold base material at a blast angle of less than 90°.

It is preferred that the sandblasting is conducted such that an angle between the surface of the mold base material and the blast gun is within a range of 0 to 60°.

According to another embodiment of the present invention, there is provided a method for producing a light diffusion sheet, the method including a step of duplicating a light diffusion sheet using a mold directly or indirectly, wherein the method uses, as the mold for duplicating a light diffusion sheet, a mold produced by conducting sandblasting for blasting abrasive material from a blast gun to the surface of a mold base material to form unevenness or roughness in the surface of the mold base material, wherein the abrasive material is blasted to the surface of the mold base material at a blast angle of less than 90°.

It is preferred that the sandblasting is conducted such that an angle between the surface of the mold base material and the blast gun is within a range of 0 to 60°.

According to another embodiment of the present invention, there is provided a light diffusion sheet including a light diffusion surface obtained by transfer of roughness structure of a surface treated by sandblasting, wherein the sandblasting is conducted at a blast angle of abrasive material of less than 90°.

According to another embodiment of the present invention, there is provided a light diffusion sheet including a light diffusion surface having a diffusion property wherein the diffusion property in the longitudinal direction is different from the diffusion property in the lateral direction, wherein the light diffusion sheet has an axis-shift of the maximum luminance in any one or both of the longitudinal direction and the lateral direction, the axis-shift of the maximum luminance being detected when an angle dependency of diffused light luminance from the diffusion surface for light emitted to the diffusion surface at an incident angle of 0° is measured.

According to another embodiment of the present invention, there is provided a light diffusion sheet including a light diffusion surface having a diffusion property wherein the diffusion property in the longitudinal direction is different from the diffusion property in the lateral direction, wherein, in the measurement of angle dependency of diffused light luminance from the diffusion surface for light emitted to the diffusion surface at an incident angle of 0°, in any one or both of the longitudinal direction and the lateral direction, the maximum luminance axis is angled with respect to the normal direction of the principal surface of the light diffusion sheet, wherein the luminance distribution is asymmetrical with respect to the maximum luminance axis.

According to another embodiment of the present invention, there is provided a light diffusion sheet including a light diffusion surface having a diffusion property wherein the diffusion property in the longitudinal direction is different from the diffusion property in the lateral direction, wherein the light diffusion surface has fine surface elements which has raised or lowered structured, and which is asymmetrical with respect to the normal of the principal surface of the light diffusion sheet.

It is preferred that the light diffusion surface has a roughness structure with a pitch of 300 μm or less.

According to another embodiment of the present invention, there is provided a screen including a light diffusion sheet which includes a light diffusion surface having a diffusion property wherein the diffusion property in the longitudinal direction is different from the diffusion property in the lateral direction, and which has an axis-shift of the maximum luminance in any one or both of the longitudinal direction and the lateral direction, the axis-shift being detected by the measurement of angle dependency of diffused light luminance from the diffusion surface for light emitted to the diffusion surface at an incident angle of 0°.

It is preferred that the axis-shift is in the direction of the middle portion of the screen.

According to another embodiment of the present invention, there is provided a screen including: the light diffusion sheet according to any of the embodiments described above; and a reflective layer formed on the light diffusion sheet on the side opposite to the light diffusion surface.

According to another embodiment of the present invention, there is provided a screen including the light diffusion sheet according to any of the embodiments described above, wherein the light diffusion sheet transmits light projected from the side opposite to the light diffusion surface and diffuses and emits the light through the light diffusion surface.

According to the embodiments of the present invention described above, the roughness can be easily formed in the surface of the mold base material by sandblasting with high precision wherein the form of the roughness in the longitudinal direction is different from that in the lateral direction, and a mold which can duplicate light diffusion sheets can be produced in single operation of the sandblasting.

In addition, according to the embodiments of the present invention, by using the mold for duplicating a light diffusion sheet, there can be easily produced with high precision a light diffusion sheet having diffusion angles in such a way that the diffusion angle in the longitudinal direction is different from the diffusion angle in the lateral direction during light transmission or reflection, or having anisotropy in the diffusion property in the longitudinal and lateral directions.

Further, by using the light diffusion sheet described above in a screen, light emitted from any portions of the screen can be controlled to be directed to a desired field of view, and therefore high, uniform luminance or gain can be obtained, thus making it possible to provide a screen having excellent recognizability.

BRIEF DESCRIPTION OF THE DRAWINGS

The above and other objects, features and advantages of the present invention will become more apparent from the following description of the presently exemplary embodiment of the invention taken in conjunction with the accompanying drawings, in which:

FIGS. 12A and 12B are diagrams showing the surface roughness of the mold for duplicating a light diffusion sheet in Example 5;

FIGS. 14A and 14B are diagrams showing the luminance distribution of the light diffusion sheet in Example 5;

DETAILED DESCRIPTION OF THE EMBODIMENTS

Hereinbelow, a method for producing a light diffusion sheet of according to an embodiment of the present invention will be described.

The method for producing a light diffusion sheet includes a step of producing a mold for use in duplicating a light diffusion sheet, and a step of duplicating a light diffusion sheet using the mold.

(1) Step for Producing a Mold for Use in Duplicating a Light Diffusion Sheet

Figure 1A:
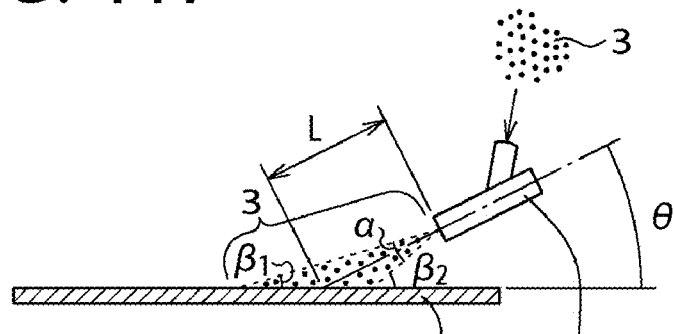
FIGS. 1A and 1B are diagrammatic views illustrating sandblasting for a mold base material in a method for producing a mold for use in duplicating a light diffusion sheet according to an embodiment of the present invention.

FIG. 1 illustrates production of a mold for use in duplicating a light diffusion sheet, in which the surface of a mold base material 1 is processed by sandblasting to produce a mold for duplicating a light diffusion sheet.

Sandblasting is processing in which abrasive material 3 is blasted from a blast gun 2 of a sandblaster (not shown) to the surface of the mold base material 1 so that the abrasive material 3 collides with the surface of the mold base material 1 to form an uneven surface in the mold base material 1.

The sandblaster is an apparatus which blasts the abrasive material 3 from the blast gun 2 by ejecting pressurized gas such as air or nitrogen to the surface of a material to be processed placed on a stage to process the surface of the material. In the present embodiment, the mold base material 1 is placed on the stage and subjected to sandblasting under the predetermined conditions shown below.

The abrasive material 3 preferably includes particles which are including a resin, glass, a metal, ceramic, or the like, and which are spherical, or angular, e.g., polygonal, especially preferably angular particles. Examples of abrasive material include glass beads, zirconia particles, steel grits, alumina particles, and silica particles.

The abrasive material 3 preferably has an average particle size of 1 to 1,000 µm, more preferably 5 to 600 µm, further preferably 5 to 50 µm.

It is preferred that the abrasive material 3 has a weight of 0.002 to 8 mg per one particle.

The mold base material 1 is a sheet including a material suitable for sandblasting. This material is preferably a resin or a metal, such as aluminum, copper, or steel, especially preferably aluminum. The mold base material 1 may have such a size that one sheet of the mold base material is sufficient to form a light diffusion sheet used in one screen. In the continuous production using a mold roll, the mold roll may have a width sufficient for the width of the light diffusion sheet.

Blasting conditions of the abrasive material 3 may be such that the blast angle (angle of depression) of the abrasive material 3 to the principal surface of the mold base material 1 in FIG. 1 is less than 90°. Specifically, an angle θ between the surface of the mold base material 1 and the blast gun 2 is preferably 0 to 60°, more preferably 0 to 20°, further more preferably 0 to 10°.

For example, in the present embodiment, when the abrasive material is blasted at an angle θ of 10°, the pitches of grooves in the blast direction of the abrasive material 3 and in the direction perpendicular to the blast direction can be changed, and further the surface roughness profile in the blast direction can be asymmetrical with respect to the principal surface axis (normal) of the light diffusion sheet.

The abrasive material 3, which has collided with the mold base material 1, grinds or deforms the surface of the mold base material 1 while being lowered in energy, and then is scattered at an angle upwards from the mold base material 1, but, when the abrasive material 3 is blasted under the above-mentioned blasting conditions, the abrasive material 3 collides at an angle with the mold base material 1, and therefore a difference is caused in the form of deformation due to the collision between the lateral direction (X-axis direction) and the longitudinal direction (Y-axis direction). For example, the form of deformation (recess) in the X-axis direction is longer than that in the Y-axis direction under the conditions in FIG. 1. In other words, the surface roughness in the X-axis direction has a pitch longer than that of the surface roughness in the Y-axis direction. The parameters of the surface roughness including the pitch can be controlled by changing the parameters of the mold base material 1, the abrasive material 3, and the sandblasting conditions (e.g., blasting conditions of the abrasive material 3). For example, when abrasive material having a large particle size is used, there can be achieved surface roughness having large pitches in both the X- and Y-axis directions, and, when abrasive material having a larger density is used, deep grooves can be realized.

Figure 2:
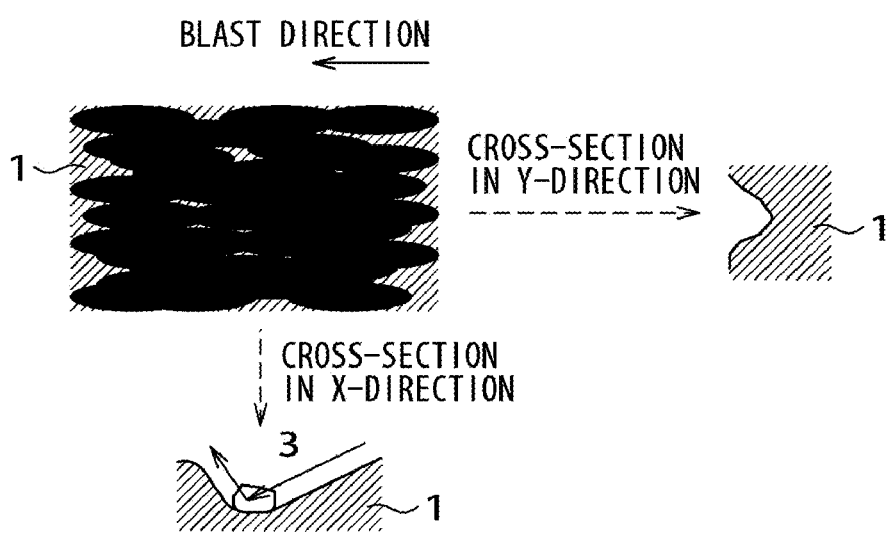
FIG. 2 is a diagrammatic view showing the surface form of the mold for duplicating a light diffusion sheet of according to an embodiment of the present invention.

With respect to the form of the processed mold base material 1, the processed form in the blast direction of the abrasive material 3 can be controlled by changing the pressure of the pressurized air of the blast gun 2, which determines the energy during the blasting, the angle of the blast gun 2, the distance between the blast gun 2 and the mold base material 1, the shape, density, or hardness of the abrasive material 3, the type of the mold base material, or the like. The processed form in the direction perpendicular to the blast direction can be controlled by changing the shape or hardness of the abrasive material. Further, the locus of the abrasive material 3 deforming the mold base material 1 while being lowered in energy and the locus of the abrasive material 3 scattered from the mold base material 1 due to the repulsion force are not symmetrical, and hence the surface form shown in FIG. 2, which is asymmetrical with respect to the principal surface axis of the mold base material 1, can be formed.

By using the mold for duplicating a light diffusion sheet produced under the above-mentioned blasting conditions, a light diffusion sheet having diffusion angles wherein the diffusion angle in the longitudinal direction is different from the diffusion angle in the lateral direction, or having anisotropy in the diffusion properties in the longitudinal and lateral directions can be produced. For example, under the blasting conditions of the abrasive material 3 in FIG. 1, the diffusion angle of the reflected light or transmitted light in the X-direction is smaller, and the diffusion angle in the Y-direction is larger, so that the reflected light or transmitted light has a diffusion property such that a luminance peak axis-shifts to the $X_1$ side in the X-direction.

Alternatively, the diffusion angle of the reflected light or transmitted light in the X-direction may be smaller and the diffusion angle in the Y-direction may be larger, and further, in the measurement of angle dependency of diffused light luminance from the diffusion surface for light emitted to the diffusion surface at an incident angle of 0°, the maximum luminance axis may be angled on the $X_1$ side with respect to the normal direction of the principal surface of the light diffusion sheet, wherein the luminance distribution may be asymmetrical with respect to the maximum luminance axis.

As the angle between the blast gun 2 and the mold base material 1 is reduced, that is, the angle θ is smaller, the slenderness ratio of the diffusion angle of the light diffusion sheet described below can be increased, and hence the effect of the anisotropy in the diffusion property is more remakable.

The abrasive material 3 is blasted from the blast gun 2 to the mold base material 1 at the angle θ with an angle width α. In other words, the abrasive material 3 collides with the mold base material at an angle within the range of angles $β_1$ to $β_2$. The angle width α is typically about 10°.

When a smaller region of the mold base material 1 is processed, the angle width α may be reduced, or a distance L between the blast gun 2 and the mold base material 1 may be reduced. When a larger region of the mold base material 1 is processed, the sandblasting may be conducted while smoothly moving the blast gun 2 or the mold base material 1.

Figure 1B:
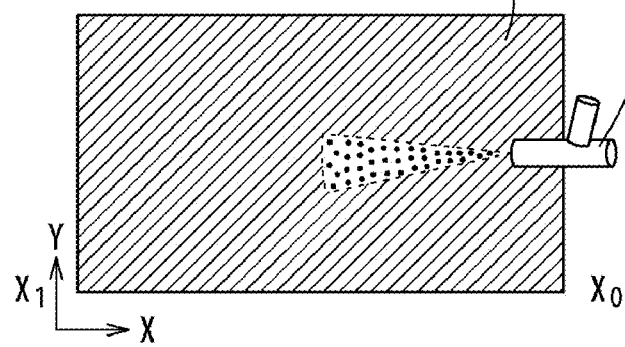

In the above description, the abrasive material 3 is blasted in one direction, i.e., in the direction of the long side of the mold base material 1 {in the X-axis direction in FIG. 1(b)} so that the blast angle (angle of depression) of the abrasive material 3 to the principal surface of the mold base material 1 is less than 90°, but, the abrasive material 3 may be blasted at the same angle of depression as the above blast angle of the abrasive material 3 to the principal surface of the mold base material 1, and further at an angle to the principal axis on the principal surface (plane defined by the X- and Y-axes) of the mold base material 1.

Figure 3A:
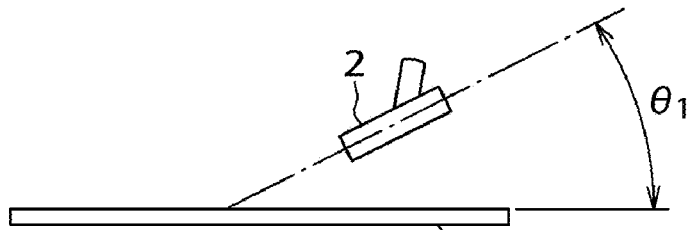
FIGS. 3A and 3B are diagrammatic views illustrating sandblasting for a mold base material in a method for producing a mold for use in duplicating a light diffusion sheet according to an embodiment of the present invention.
Figure 3B:
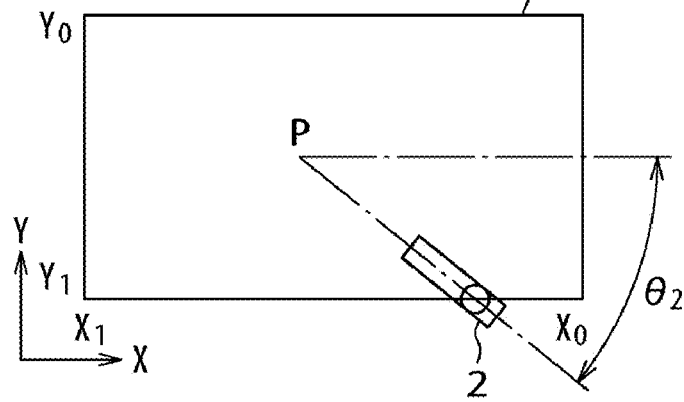

For example, as shown in FIG. 3, the blast angle of the abrasive material 3 to the principal surface of the mold base material 1 is an angle $θ_1$ of depression {FIG. 3(a)}, and the blast gun 2 is disposed at an angle $θ_2$ to the X-axis. Thus, the reflected light or transmitted light has the diffusion property such that a luminance peak axis-shifts to the $X_1$ side in the X-axis direction and to the $Y_1$ side in the Y-axis direction.

In the present embodiment, by scanning the blast gun 2 over the mold base material 1 while blasting the abrasive material 3 from the blast gun 2, the entire principal surface of the mold base material 1 is sandblasted.

Figure 4:
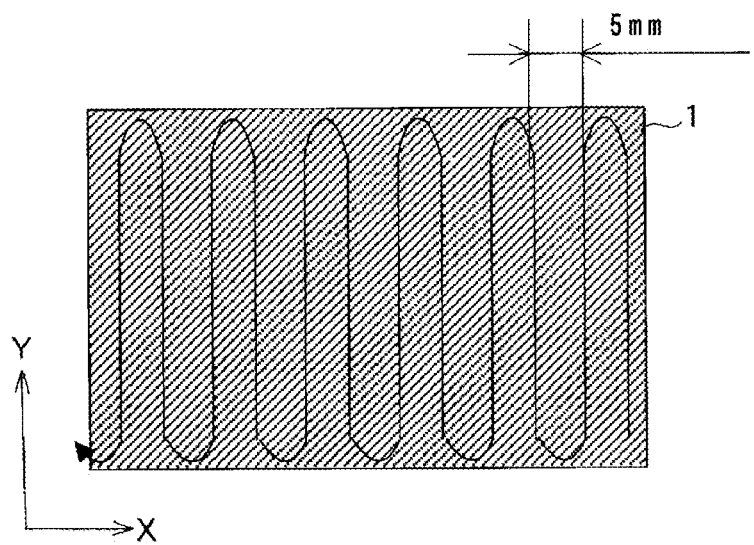
FIG. 4 is a diagrammatic view showing scanning of a blast gun in the method for producing a mold for use in duplicating a light diffusion sheet according to an embodiment of the present invention.

An example of scanning of the blast gun 2 is shown in FIG. 4. The blast gun 2 is moved over the mold base material 1 in one direction of the Y-axis at a constant rate while blasting the abrasive material 3 from the blast gun 2, and, at a time when the region of collision of the abrasive material 3 reaches the almost end of the mold base material 1, the blast gun 2 is moved in the X-axis direction at a certain pitch, and then moved in the opposite direction of the Y-axis at a constant rate. Subsequently, each time when the region of collision of the abrasive material 3 reaches the almost end of the mold base material 1, the blast gun 2 is moved in the X-axis direction at a certain pitch, and then the movement in the Y-axis direction is reversed and the sandblasting is continued, thus forming a desired uneven surface in the entire mold base material 1.

It is preferred that the pitch of the movement in the X-axis direction is adjusted so that the adjacent regions of collision of the abrasive material 3 overlap to a certain extent and the mold base material 1 has a collectively uneven surface. Alternatively, the region of collision of the abrasive material 3 may be covered with a mask so that the abrasive material 3 collides with the mold base material 1 only at the middle region of the collision region.

The scanning method may be either a method in which the mold base material 1 is fixed and the blast gun 2 is moved, or a method in which the stage on which the mold base material 1 is placed is moved in the X-axis direction and the blast gun 2 is moved in the Y-axis direction.

With respect to the blasting conditions of the abrasive material 3, the scanning may be conducted so that the angle between the surface of the mold base material 1 and the blast gun 2 is constant as shown in FIG. 1, but the angle θ may be changed depending on the position of the mold base material 1 on the X-axis and Y-axis coordinates.

(2) Step for Duplicating a Light Diffusion Sheet

The mold for duplicating a light diffusion sheet produced in the above-described step for producing a mold for use in duplicating a light diffusion sheet has a finely engraved surface having a predetermined roughness structure. A light diffusion sheet may be produced utilizing the finely engraved surface. Any method of producing a light diffusion sheet from the finely engraved surface, which directly or indirectly employs the instant mold for copying a light diffusion sheet, may be used in the present embodiment.

For example, the methods that directly employ the mold for copying a light diffusion sheet may include a method in which a light diffusion sheet is produced by press-forming process with the mold, for example, by pressing the mold against thermoforming plastic film to shape a copied light diffusion sheet. Alternatively, a desired light diffusion sheet may be obtained by applying an ultraviolet curing resin to the mold and covering it with a transparent substrate, and curing the resin by irradiation of ultraviolet light and removing the cured resin from the mold. Further alternatively, a light diffusion sheet including stacked cured resin layers may be produced by repeating the above treatment of application of the resin onto the mold and curing of the resin covered with the transparent substrate. In order to improve demolding property of molding material from the mold, it is preferable to treat the surface of the mold for demolding with nickel evaporation, fluorinated material, silicon system material coating, etc.

The methods that indirectly employ the mold for copying a light diffusion sheet may include a method in which a mold for copying a light diffusion sheet, which is manufactured in a manufacturing step of the above-described mold for copying a light diffusion sheet, may be made to a master, and such a master mold may be copied by producing its electroforming mold, and then a light diffusion sheet may be copied with the copied mold in the similar manner as that of the above-described method that directly employs the mold for copying a light diffusion sheet. Alternatively, after producing an reverse-shaped electroforming mold, a transfer-copied mold may be manufactured with transparent substance such as non-alkali glass, which absorbs less in violet light range. The use of transparent mold allows to cure resin by irradiating ultraviolet light from the side of the mold when a copy of the light diffusion sheet is made with ultraviolet resin curing.

It is preferred that the ultraviolet curing resin used has optical transparency. A variety of resins, such as acrylic resins, polyester resins, polyvinyl chloride, polyurethane, and silicone resins, may be used, but there is no particular limitation. An ultraviolet absorber for preventing the cured resin from suffering degradation due to ultraviolet light irradiation can be added in a slight amount, or a light absorber can be added in the application which needs coloring.

In addition, as the material constituting the light diffusion sheet, a thermoformable plastic or radiation curing resin containing fine particles for controlling the refractive index of the sheet can be used, and examples of fine particles to be added include oxides of Ti, Zr, Al, Ce, Sn, La, In, Y, Sb, or the like, and alloy oxides of In—Sn or the like. When Ti oxide contains an appropriate amount of an oxide of Al, Zr, or the like for suppressing the photocatalytic action, the effect of the present embodiment is not sacrificed.

The fine particles preferably have a specific surface area of 55 to 85 m$^2$/g, more preferably 75 to 85 m$^2$/g. When the specific surface area of the fine particles falls in this range, a dispersion treatment for the fine particles enables the fine particles to have a particle size of 100 nm or less in the material for optical film, thus making it possible to obtain an optical film having a very small haze.

A dispersant for dispersing the fine particles is added in an amount of 3.2 to 9.6×10$^{11}$ mol/m$^2$, based on the fine particles, and, when the amount of the dispersant is smaller than this range, satisfactory dispersibility of the particles in the light diffusion sheet cannot be obtained. On the other hand, when the amount of the dispersant is larger than this range, the volume ratio of the dispersant to the coated film is increased to lower the refractive index of the film, so that the range of the refractive index which can be employed becomes narrow, thus making it difficult to design the light diffusion sheet.

The amount of the polar functional group which is a hydrophilic group contained in the dispersant is 10$^{-3}$ to 10$^{-1}$ mol/g. When the amount of the functional group is smaller or larger than this range, an effect in respect of dispersion of the fine particles is not exhibited, leading to a lowering of the dispersibility.

The functional groups shown below are effective polar functional groups since they cause no aggregation:

—SO$_3$M, —OSO$_3$M, —COOM, P=O(OM)$_2$ (wherein M represents a hydrogen atom or an alkali metal, such as lithium, potassium, or sodium), tertiary amines, and quaternary ammonium salts R$_1$(R$_2$)(R$_3$)NHX (wherein each of R$_1$, R$_2$, and R$_3$ represents a hydrogen atom or a hydrocarbon group, and X represents an ion of halogen element, such as chlorine, bromine, or iodine, or an inorganic or organic ion)

—OH, —SH, —CN, an epoxy group, etc.

With respect to the site into which the polar functional group is introduced, there is no particular limitation. These dispersants can be used individually or in combination.

In the present embodiment, the amount of the dispersant (or the total amount of the dispersants) in the coated film is preferably 20 to 60 parts by weight, more preferably 38 to 55 parts by weight, relative to 100 parts by weight of the ferromagnetic powder. With respect to the site into which the polar functional group is introduced, there is no particular limitation.

It is preferred that the lipophilic group in the dispersant has a weight average molecular weight of 110 to 3,000. When the molecular weight of the lipophilic group is smaller than this range, a drawback occurs in that the dispersant is not satisfactorily dissolved in an organic solvent. On the other hand, when the molecular weight is larger than this range, satisfactory dispersibility in the optical film cannot be obtained. The molecular weight of the dispersant is measured by gel permeation chromatography (GPC).

The dispersant may have a functional group which undergoes a curing reaction, together with a binder. If the binder other than the dispersant in the present embodiment is contained, a polyfunctional polymer having a number of bonding groups, or a monomer is preferred.

For controlling the thickness of the light diffusion sheet, the coating composition can be diluted with an organic solvent, and, for example, a ketone solvent, such as acetone, methyl ethyl ketone, methyl isobutyl ketone, or cyclohexanone; an alcohol solvent, such as methanol, ethanol, propanol, butanol, or isobutyl alcohol; or an ester solvent, such as methyl acetate, ethyl acetate, butyl acetate, propyl acetate, ethyl lactate, or ethylene glycol acetate may be used. These organic solvents need not have a purity as high as 100%, and they may contain an impurity, such as an isomer, an unreacted substance, a decomposition product, an oxide, or moisture, in an amount of 20% or less. For applying the coating composition onto the substrate having low surface energy, it is desired to select a solvent having a lower surface tension, and examples of such solvents include methyl isobutyl ketone, methanol, and ethanol.

Examples of binders, which undergo a curing reaction together with the dispersant, include thermosetting resins, ultraviolet (UV) curing resins, and electron beam (EB) curing resins. Examples of thermosetting resins, UV curing resins, and EB curing resins include polystyrene resins, styrene copolymers, polycarbonate, phenolic resins, epoxy resins, polyester resins, polyurethane resins, urea resins, melamine resins, polyamine resins, and urea-formaldehyde resins. A polymer having another cyclic (aromatic, heterocyclic, or alicyclic) group may be used. Alternatively, a resin having in its carbon chain fluorine or a silanol group may be used.

A method of advancing the curing reaction of the resin may be any one of irradiation and heat, but, when the curing reaction of the resin is advanced by irradiation of ultraviolet light, it is preferred that the reaction is carried out in the presence of a polymerization initiator. Examples of radical polymerization initiators include azo initiators, such as 2,2'-azobisisobutyronitrile and 2,2'-azobis(2,4-dimethylvaleronitrile); and peroxide initiators, such as benzoyl peroxide, lauryl peroxide, and t-butyl peroctoate. The amount of the initiator used is preferably 0.2 to 10 parts by weight, more preferably 0.5 to 5 parts by weight, relative to 100 parts by weight of the sum of the polymerizable monomers.

The transparent substrate may be any material which satisfies desired optical properties, for example, a transparent film including a polymer, such as polyethylene terephthalate (PET), polyethylene naphthalate (PEN), polyether sulfone (PES), or polyolefin (PO), a glass plate, an acrylic plate, a methacryl styrene plate, a polycarbonate plate, or a fluorine resin. It is preferred that the material constituting the transparent substrate has optical properties such that the refractive index is 1.3 to 1.6, the haze is 8% or less, and the light transmittance is 80% or more. The transparent substrate may have an anti-glare function.

The light diffusion sheet of the present embodiment includes a light diffusion surface obtained by transfer of a surface form of the mold produced by the above method, the light diffusion surface having the diffusion property wherein the diffusion property in the longitudinal direction is different from the diffusion property in the lateral direction, wherein the light diffusion sheet has an axis-shift of the maximum luminance in any one or both of the longitudinal direction and the lateral direction, the axis-shift being detected by the measurement of angle dependency of diffused light luminance from the diffusion surface for light emitted to the diffusion surface at an incident angle of 0°.

Alternatively, the light diffusion sheet of the present embodiment may include a light diffusion surface obtained by transfer of a surface form of the mold produced by the above method, the light diffusion surface having the diffusion property wherein the diffusion property in the longitudinal direction are different from the diffusion property in the lateral direction, wherein, in the measurement of angle dependency of diffused light luminance from the diffusion surface for light emitted to the diffusion surface at an incident angle of 0°, in any one or both of the longitudinal direction and the lateral direction, the maximum luminance axis is angled with respect to the normal direction of the principal surface of the light diffusion sheet, wherein the luminance distribution is asymmetrical with respect to the maximum luminance axis.

Further, the light diffusion sheet of the present embodiment includes a light diffusion surface including a plurality of fine surface elements having raised or lowered structures, and having the diffusion property wherein the diffusion property in the longitudinal direction is different from the diffusion property in the lateral direction, wherein the light diffusion surface has fine surface elements which has raised or lowered structure, and which is asymmetrical with respect to the normal of the principal surface of the light diffusion sheet.

A reflective screen is described as a screen according to an embodiment of the present invention.

Figure 5:
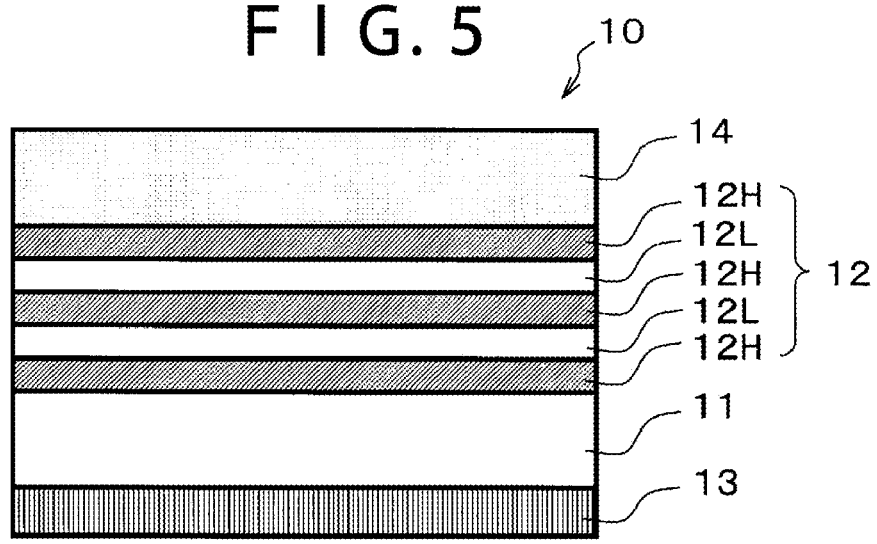
FIG. 5 is a cross-sectional view showing a construction of a reflective screen according to an embodiment of the present invention.

FIG. 5 is across-sectional view showing the construction of a reflective screen of the present embodiment.

The reflective screen of the present embodiment includes a light diffusion sheet 14 according to the embodiments of the present embodiment, and a reflective layer formed on the light diffusion sheet 14 on the side opposite to the light diffusion surface, and has a construction such that, for example, as shown in FIG. 5, an optical multilayer film 12, a light absorbing layer 13, and the light diffusion sheet 14 are formed on a substrate 11.

The substrate 11 may be including any material which satisfies desired optical properties, for example, a transparent film, a glass plate, an acrylic plate, a methacryl styrene plate, a polycarbonate plate, a lens, or a fluorine resin. It is preferred that the material constituting the substrate 11 has optical properties such that the refractive index is 1.3 to 1.6, the haze is 8% or less, and the light transmittance is 80% or more. The substrate 11 may have an anti-glare function.

The optical multilayer film 12 includes an optical film 12H having a high refractive index obtained by applying a coating composition H for optical film described below and curing it, and an optical film 12L having a low refractive index obtained by applying a coating composition L for optical film described below and curing it wherein the optical film 12H and the optical film 12L are alternately stacked on one another. Specifically, the optical multilayer film 12 has a construction such that the optical film 12H is first formed on the substrate, and then the optical film 12L is formed thereon, and subsequently the optical film 12H and the optical film 12L are alternately formed, and finally the optical film 12H is formed, and it is preferred that the optical multilayer film 12 is a stacked film including (2n+1) layers (wherein n is an integer of 1 or more).

The optical film 12H is an optical film formed by applying the coating composition H for optical film onto the substrate 11 or optical film 12L and then effecting a curing reaction for the composition.

This optical film preferably has a thickness of 80 nm to 15 μm, more preferably 600 to 1,000 nm. When the thickness of the optical film is larger than 15 μm, the amount of a haze component including the undispersed fine particles is increased, making it difficult to achieve an appropriate function of the optical film.

The optical film preferably has a refractive index of 1.6 to 2.1. When the refractive index of the optical film is higher than 2.1, the dispersion property of the fine particles is unsatisfactory, so that the function of the optical film deteriorates, and, when the refractive index is lower than 1.6, the required optical properties are frequently not obtained.

The optical film 12L is a fluorine-containing film or silica or hollow fine particles-containing film formed by applying the coating composition L for optical film onto the optical film 12H and then effecting a curing reaction for the composition.

The optical film 12L especially preferably has a refractive index of 1.45 or less. The refractive index of the optical film 12L is determined depending on the type of the resin contained in the coating composition and optionally the type and amount of the fine particles.

This optical film preferably has a thickness of 80 nm to 15 μm, more preferably 600 to 1,000 nm.

By virtue of having the above-described construction, the optical multilayer film has high reflection properties with respect to light in three wavelength regions, i.e., red, green, and blue light, and has high transmission properties with respect to at least visible light in wavelength regions other than the three wavelength regions. By changing the refractive index or thickness of each of the optical film 12H and the optical film 12L, the wavelength in the three wavelength regions to be reflected by the optical multilayer film can be shifted and controlled, so that the optical multilayer film can appropriately deal with the wavelength of the light emitted from a projector.

With respect to the number of layers of the optical film 12H and optical film 12L constituting the optical multilayer film, there is no particular limitation, and the optical films 12H, 12L may have a desired number of layers. It is preferred that the optical multilayer film includes an odd number of layers so that the outermost layer on each of the projector light incident side and the opposite side includes the optical film 12H. The optical multilayer film including an odd number of layers has a more excellent function of a filter for the wavelength regions of the three primary colors than that of an optical multilayer film including an even number of layers.

Specifically, it is preferred that the optical multilayer film includes an odd number of layers in the range of 3 to 7 layers. When the number of layers is 2 or less, the optical multilayer film unsatisfactorily functions as a reflective layer. On the other hand, the larger number of layers constituting the optical multilayer film, the higher the reflectance of the optical multilayer film, but, when the number of layers is 8 or more, the increase rate of the reflectance is small, and the effect of improving the reflectance expected by increasing the time for forming the optical multilayer film cannot be obtained.

The light absorbing layer 13 absorbs the light which has passed through the optical multilayer film 12, and, for example, in FIG. 5, the light absorbing layer 13 is formed by applying a black coating composition to the surface of the substrate 11 on the side opposite to the surface on which the optical multilayer film 12 is formed. Alternatively, a black film may be stacked on the surface.

The light diffusion sheet 14 is obtained by the above-described method for producing a light diffusion sheet, and formed by stacking on the optical multilayer film 12.

Here, an example of the optical multilayer film 12 which is a wavelength-selecting type reflective layer is shown as a reflective layer, but the reflective layer is not limited to this in the present embodiment, and may be any reflective layer which can reflect the image light. Examples include reflective layers using a material having a high reflectance over the wide range of wavelengths of visible light, such as aluminum or silver.

In the reflective screen 10, light emitted from any portions of the screen can be controlled to be directed to a desired field of view, and therefore uniform and high luminance or gain can be obtained, making it possible to provide a screen having excellent recognizability or much easier to recognize.

The screen suppresses surface scattering of the incident light on the screen, and makes possible selective reflection such that the light in a specific wavelength from a projector is reflected and incident light on the screen in wavelength regions other than the specific wavelength, e.g., ambient light is transmitted and absorbed, lowering the black level of an image on the reflective screen 10 to achieve high contrast, thus allowing an image with high contrast to appear on the screen even in a brightly lit room. For example, when light from an RGB light source, such as a grating light valve projector using a grating light valve (GLV), is projected to the screen 10, an excellent image with high contrast free from an adverse effect of ambient light can be seen at a large viewing angle.

Specifically, the incident light to the reflective screen 10 passes through the optically functional diffusion sheet 11 without being scattered at the surface of the diffusion sheet, and reaches the optical multilayer film 12, and the optical multilayer film 12 transmits the ambient light component contained in the incident light, which is absorbed by the light absorbing layer 14, and only the light in a specific wavelength region responsible for the image is selectively reflected, and the reflected light is diffused by the surface of the optically functional diffusion sheet 11 and sent to a viewer as image light at a large viewing angle. Therefore, the adverse effect of ambient light on image light which is the reflected light can be removed almost completely, making it possible to achieve even higher contrast than the contrast obtained by a screen of related art.

Here, an explanation is made on the materials H and L for optical film, which are coating compositions for forming the optical film 12H and optical film 12L.

(1) Material H for Optical Film

The coating composition H for optical film contains fine particles, an organic solvent, a binder which absorbs energy to undergo a curing reaction, and a dispersant.

The fine particles are fine particles including a high refractive-index material added for controlling the refractive index of the optical film formed, and examples include oxides of Ti, Zr, Al, Ce, Sn, La, In, Y, Sb, or the like, and alloy oxides of In—Sn or the like. When Ti oxide contains an appropriate amount of an oxide of Al, Zr, or the like for suppressing the photocatalytic action, the effect of the present embodiment is not sacrificed.

The fine particles preferably have a specific surface area of 55 to 85 $m^2/g$, more preferably 75 to 85 $m^2/g$. When the specific surface area of the fine particles falls in this range, a dispersion treatment for the fine particles enables the fine particles to have a particle size of 100 nm or less in the material for optical film, thus making it possible to obtain an optical film having a very small haze.

A dispersant for dispersing the fine particles is added in an amount of 3.2 to $9.6 \times 10^{11}$ mol/$m^2$, based on the fine particles, and, when the amount of the dispersant is smaller than this range, satisfactory dispersibility of the particles in the optical film cannot be obtained. On the other hand, when the amount of the dispersant is larger than this range, the volume ratio of the dispersant to the coated film is increased to lower the refractive index of the film, so that the range of the refractive index which can be employed becomes narrow, thus making it difficult to design the optical film lamination.

The amount of the polar functional group which is a hydrophilic group contained in the dispersant is $10^{-3}$ to $10^{-1}$ mol/g. When the amount of the functional group is smaller or larger than this range, an effect in respect of dispersion of the fine particles is not exhibited, leading to a lowering of the dispersibility.

The functional groups shown below are effective polar functional groups since they cause no aggregation:
—$SO_3M$, —$OSO_3M$, —COOM, P=O(OM)$_2$ (wherein M represents a hydrogen atom or an alkali metal, such as lithium, potassium, or sodium), tertiary amines, and quaternary ammonium salts $R_1(R_2)(R_3)$NHX (wherein each of $R_1$, $R_2$, and $R_3$ represents a hydrogen atom or a hydrocarbon group, and X represents an ion of halogen element, such as chlorine, bromine, or iodine, or an inorganic or organic ion)

—OH, —SH, —CN, an epoxy group, etc.

With respect to the site into which the polar functional group is introduced, there is no particular limitation. These dispersants can be used individually or in combination.

In the present embodiment, the amount of the dispersant (or the total amount of the dispersants) in the coated film is preferably 20 to 60 parts by weight, more preferably 38 to 55 parts by weight, relative to 100 parts by weight of the ferromagnetic powder. With respect to the site into which the polar functional group is introduced, there is no particular limitation.

It is preferred that the lipophilic group in the dispersant has a weight average molecular weight of 110 to 3,000. When the molecular weight of the lipophilic group is smaller than this range, a drawback occurs in that the dispersant is not satisfactorily dissolved in an organic solvent. On the other hand, when the molecular weight is larger than this range, satisfactory dispersibility in the optical film cannot be obtained. The molecular weight of the dispersant is measured by gel permeation chromatography (GPC).

The dispersant may have a functional group which undergoes a curing reaction, together with a binder. When the binder other than the dispersant in the present embodiment is contained, a polyfunctional polymer having a number of bonding groups, or a monomer is preferred.

As the organic solvent, for example, a ketone solvent, such as acetone, methyl ethyl ketone, methyl isobutyl ketone, or cyclohexanone; an alcohol solvent, such as methanol, ethanol, propanol, butanol, or isobutyl alcohol; or an ester solvent, such as methyl acetate, ethyl acetate, butyl acetate, propyl acetate, ethyl lactate, or ethylene glycol acetate may be used. These organic solvents need not have a purity as high as 100%, and they may contain an impurity, such as an isomer, an unreacted substance, a decomposition product, an oxide, or moisture, in an amount of 20% or less. For applying the coating composition onto the substrate or optical film having low surface energy, it is desired to select a solvent having a lower surface tension, and examples of such solvents include methyl isobutyl ketone, methanol, and ethanol.

Examples of binders, which undergo a curing reaction together with the dispersant, include thermosetting resins, ultraviolet (UV) curing resins, and electron beam (EB) curing resins. Examples of thermosetting resins, UV curing resins, and EB curing resins include polystyrene resins, styrene copolymers, polycarbonate, phenolic resins, epoxy resins, polyester resins, polyurethane resins, urea resins, melamine resins, polyamine resins, and urea-formaldehyde resins. A polymer having another cyclic (aromatic, heterocyclic, or alicyclic) group may be used. Alternatively, a resin having in its carbon chain fluorine or a silanol group may be used.

A method of advancing the curing reaction of the resin may be any one of irradiation and heat, but, when the curing reaction of the resin is advanced by irradiation of ultraviolet light, it is preferred that the reaction is carried out in the presence of a polymerization initiator. Examples of radical polymerization initiators include azo initiators, such as 2,2'-azobisisobutyronitrile and 2,2'-azobis(2,4-dimethylvaleronitrile); and peroxide initiators, such as benzoyl peroxide, lauryl peroxide, and t-butyl peroctoate. The amount of the initiator used is preferably 0.2 to 10 parts by weight, more preferably 0.5 to 5 parts by weight, relative to 100 parts by weight of the sum of the polymerizable monomers.

The material H for optical film is applied and then dried to form an optical film 22H in an uncured state, and then a curing reaction for the film is promoted by irradiation or heat in the curing step to form an optical film 12H of a high refractive-index type.

(2) Material L for Optical Film

The coating composition L for optical film contains an organic solvent and a binder. The binder is dissolved in the organic solvent and, if necessary, fine particles may be added to and dispersed in the solution of the binder.

The binder is a resin having in its molecule a functional group which undergoes a curing reaction by irradiation of ultraviolet light or the like or energy from heat, and especially preferred is a fluorine resin from the viewpoint of facilitating the removal from the release film. It is preferred to use a polymer having a main chain modified with fluorine, a polymer having a side chain modified with fluorine, or a monomer having fluorine.

Examples of polymers having a main chain modified with fluorine include perfluoro main chain-type perfluoropolyether, perfluoro side chain-type perfluoropolyether, alcohol-modified perfluoropolyether, and isocyanate-modified perfluoropolyether, and examples of monomers having fluorine include $CF_2$=$CF_2$, $CH_2$=$CF_2$, and $CF_2$=CHF. A polymer obtained by polymerizing or block-polymerizing these monomers can be used.

As examples of polymers having a side chain modified with fluorine, there can be mentioned solvent-soluble polymers having a main chain graft-polymerized, and, as an especially preferred example of the low refractive-index thermoplastic polymer, there can be mentioned polyvinylidene fluoride since it can be handled with ease as a resin which can use a solvent. When polyvinylidene fluoride is used as the low refractive-index thermoplastic polymer, the resultant low refractive-index layer has a refractive index of about 1.4, and, for further lowering the refractive index of the low refractive-index layer, a low refractive-index acrylate, such as trifluoroethyl acrylate, may be added in an amount of 10 to 300 parts by weight, preferably 100 to 200 parts by weight, relative to 100 parts by weight of an ionization radiation curing resin.

The fine particles are fine particles including a low refractive-index material optionally added for controlling the refractive index of the optical film formed, and preferred are ultra-fine particles including a material, such as LiF (refractive index: 1.4), $MgF_2$ (refractive index: 1.4), $3NaF.AlF_3$ (refractive index: 1.4), $AlF_3$ (refractive index: 1.4), or $SiO_x$ ($1.5 \leq x \leq 2.0$) (refractive index: 1.35 to 1.48) Hollow fine particles may be contained.

As the organic solvent, for example, ketone solvents, such as acetone, methyl ethyl ketone, methyl isobutyl ketone, and cyclohexanone; alcohol solvents, such as methanol, ethanol, propanol, butanol, and isobutyl alcohol; ester solvents, such as methyl acetate, ethyl acetate, butyl acetate, propyl acetate, ethyl lactate, and ethylene glycol acetate; fluorine-containing solvents, such as fluorine-containing aromatic hydrocarbons, e.g., perfluorobenzene, pentafluorobenzene, 1,3-bis(trifluoromethyl)benzene, and 1,4-bis(trifluoromethyl)benzene, fluorine-containing alkylamines, e.g., perfluorotributylamine and perfluorotripropylamine, fluorine-containing aliphatic hydrocarbons, e.g., perfluorohexane, perfluorooctane, perfluorodecane, perfluorododecane, perfluoro-2,7-dimethyloctane, 1,3-dichloro-1,1,2,2,3-pentafluoropropane, 1H-1,1-dichloroperfluoropropane, 1H-1,3-dichloroperfluoropropane, 1H-perfluorobutane, 2H,3H-perfluoropentane, 3H,4H-perfluoro-2-methylpentane, 2H,3H-perfluoro-2-methylpentane, perfluoro-1,2-dimethylhexane, perfluoro-1,3-dimethylhexane, 1H-perfluorohexane, 1H,1H,1H,2H,2H-perfluorohexane, 1H,1H,1H,2H,2H-perfluorooctane, 1H-perfluorooctane, 1H-perfluorodecane, and 1H,1H,1H,2H,2H-perfluorodecane, fluorine-containing alicyclic hydrocarbons, e.g., perfluorodecalin, perfluorocyclohexane, and perfluoro-1,3,5-trimethylcyclohexane, and fluorine-containing ethers, e.g., perfluoro-2-butyltetrahydrofuran, and fluorine-containing low molecular-weight polyethers, can be used individually or in combination. These organic solvents need not have a purity as high as 100%, and they may contain an impurity, such as an isomer, an unreacted substance, a decomposition product, an oxide, or moisture, in an amount of 20% or less.

The material L for optical film is applied and then dried to form an optical film 22L in an uncured state, and then a curing reaction for the film is promoted by irradiation or heat in the curing step to form an optical film 12L of a low refractive-index type.

Next, a method for producing a reflective screen 10 according to an embodiment of the present invention is described below.

(s1) A polyethylene terephthalate (PET) film is prepared as a substrate 11, and a coating composition H for optical film is applied in a predetermined amount to the principal surface of the substrate 11.

(s2) The film of the coating composition H for optical film is dried, and then cured by irradiation of ultraviolet light to form an optical film 12H having a predetermined thickness.

(s3) Then, a coating composition L for optical film is applied in a predetermined amount to the optical film 12H.

(s4) The resultant film is dried, and then cured by heat to form an optical film 12L having a predetermined thickness, thus forming a stacked structure including the optical film 12H and the optical film 12L.

(s5) Then, the coating composition H for optical film is applied in a predetermined amount to the optical film 12L constituting the outermost layer of the substrate 11.

(s6) The film of the coating composition H for optical film is dried, and then cured by irradiation of ultraviolet light to form an optical film 12H having a predetermined thickness. Subsequently, a cycle of treatments in the steps s3 to s6 is repeated predetermined times to form an optical multilayer film 12 on the substrate 11.

(s7) A low refractive-index, transparent bonding agent (EPOTEK396; manufactured and sold by EPOXY TECHNOLOGY) is applied to the surface of the outermost layer of the optical multilayer film 12, and a light diffusion sheet 14 is placed on the bonding agent applied so that the surface of the light diffusion sheet 14 on the side opposite to the uneven surface is in contact with the bonding agent, and then the bonding agent is cured so as to serve as a bonding layer for bonding the optical multilayer film 12 to the light diffusion sheet 14.

(s8) A resin containing a black light absorber is applied to the back surface of the substrate 11 to form a light absorbing layer 13, thus obtaining a reflective screen 10 of the present embodiment.

Next, a transmissive screen is descried as a screen according to another embodiment of the present invention.

Figure 6:
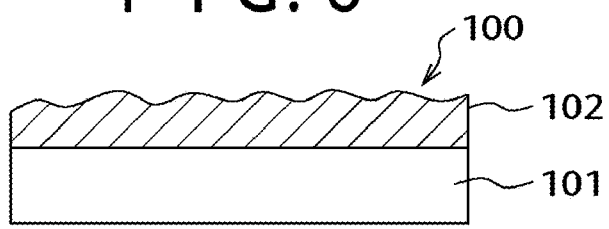
FIG. 6 is a cross-sectional view showing a construction of a transmissive screen according to an embodiment of the present invention.

FIG. 6 is a cross-sectional view showing the construction of a transmissive screen of the present embodiment. The transmissive screen of the present embodiment includes the light diffusion sheet of the present embodiment, wherein the light diffusion sheet transmits light projected from the side opposite to the light diffusion surface and diffuses and emits the light through the light diffusion surface, for example, as shown in FIG. 6, the transmissive screen includes a light diffusion sheet 102 on a substrate 101.

The substrate 101 is a substrate for transmissive screen, and can be constituted by a polymer, such as polyethylene terephthalate (PET), polyethylene naphthalate (PEN), polymethyl methacrylate (PMMA), polyether sulfone (PES), or polyolefin (PO). When the substrate is used in a transmissive screen, the screen incorporated into a display must be self-supporting, and therefore it is desired that the substrate 101 is a transparent material having a thickness of 0.2 mm or more and having rigidity.

The light diffusion sheet 102 is obtained by the above-described method for producing a light diffusion sheet, and scatters the light which has passed through the substrate 101 to obtain scattered light. A viewer can see a natural image by observing the scattered reflected light.

For example, the transmissive screen of the present embodiment and a transmissive screen using a light diffusion sheet of related art such that the maximum luminance is in the normal direction and the diffusion property is symmetrical with respect to the maximum luminance axis are disposed side by side, and image light is projected to each screen from the back side to observe the image from the front side of the screen. As a result, in the display using the transmissive screen of related art, the upper part of the image is bright and the lower part of the image is dim, whereas, in the display using the transmissive screen of the present embodiment, a bright image having a high luminance over the entire screen can be obtained.

The diffusion property is preferably controlled by adjusting the surface form of the light diffusion sheet 102 per position of the screen so that the collective luminance distribution observed by a viewer becomes uniform over the screen. For achieving this, for example, the axis-shift in the luminance peak is preferably directed to the middle portion of the screen. Specifically, with respect to the collective diffusion property on the entire screen, the diffusion property on the whole periphery portion of the screen preferably have a feature such that a luminance peak of the transmitted light is at an angle in the direction of the middle portion of the screen and the angle is continuously increased in the direction of from the middle portion to the periphery portion of the screen.

The transmissive screen 100 of the present embodiment is produced by stacking the light diffusion sheet 102 on one surface of the substrate 101 including, e.g., a PET film.

The application of the light diffusion sheet of the present embodiment is not limited to the projection type display, but the light diffusion sheet can be applied to various fields, such as displays and lighting apparatuses, which need to control the viewing angle. For example, when a light source cannot be disposed on the back or front side due to the restriction on the arrangement of the light source, the use of the light diffusion sheet produced by the present embodiment enables light focus in a desired direction. In addition, in the application of lighting apparatus, by disposing a lighting having the light diffusion sheet produced by the present embodiment at the corner of a room, the middle portion of the room is lit, achieving a lighting effect.

The present invention will be further described with reference to the following Examples. The following Examples are merely examples, and the present invention is not limited to the following Examples.

EXAMPLE 1

A mold for use in duplicating a light diffusion sheet was produced under the following conditions.

(1) Mold base material: Aluminum sheet (X: 200 mm×Y: 100 mm)

(2) Sandblasting Conditions

Sandblaster {model: SGF-4 (A); manufactured and sold by Fuji Manufacturing Co., Ltd.}

Grit: Alumina (#180; average particle size: 76 μm)

Distance between the blast gun and the mold base material: 50 mm

Angle between the blast gun and the mold base material: 8°

Compressed air pressure: 0.5 MPa

Blasting conditions of the abrasive material for the surface of the mold base material: Conditions shown in FIG. 1

Blast gun scanning conditions: Scanned at a pitch of 5 mm in the X-direction and in the Y-direction as shown in FIG. 4.

Figure 7:
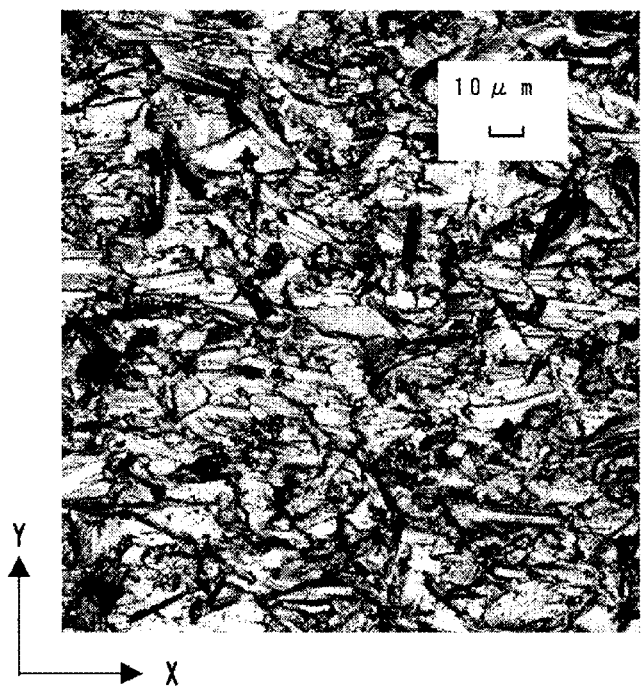
FIG. 7 is a photomicrograph showing the surface state of the mold for duplicating a light diffusion sheet in Example 1.

The surface state of the mold obtained is shown in FIG. 7. There was observed a state such that there was a difference in the roughness structure of the surface between the longitudinal direction and the lateral direction (the X-axis direction and the Y-axis direction) and the form of deformation (recess) in the X-axis direction was longer than that in the Y-axis direction.

Figure 8:
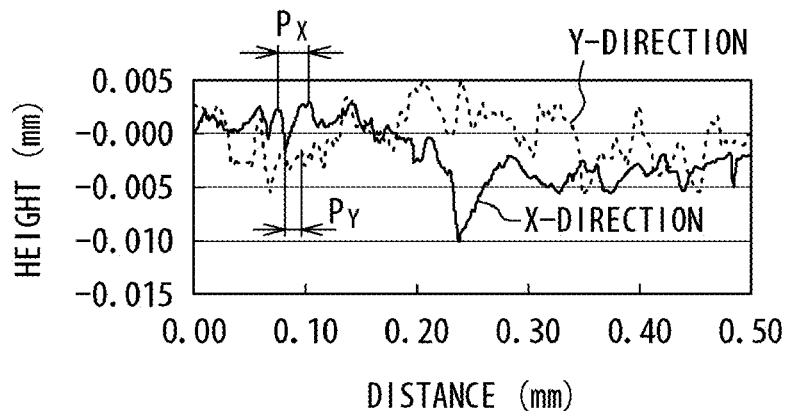
FIG. 8 is a diagram showing the surface roughness of the mold for duplicating a light diffusion sheet in Example 1.

Next, the results of the measurement of surface roughness of the mold are shown in FIG. 8. A pitch Px of the surface roughness in the X-axis direction was longer than a pitch Py of the surface roughness in the Y-axis direction. An average the roughness space Sm was as follows: X-axis direction: S=0.14; and Y-axis direction: S=0.08.

EXAMPLE 2

Next, a transparent resin (PET-G film, DIAFIX; manufactured and sold by Mitsubishi Plastics, Inc.) was pressed by means of the mold in Example 1 to produce a light diffusion sheet.

The light diffusion sheet obtained was permitted to transmit collimated rays of light from the back surface of the sheet to measure a diffusion angle of the transmitted light from the front side of the sheet. The results are shown in FIG. 9.

The light diffusion sheet exhibited diffusion angles wherein the diffusion angle in the lateral direction (X-axis direction) is different from the diffusion angle in the longitudinal direction (Y-axis direction), and a luminance half band width in the X-axis direction was 18° and that in the Y-axis direction was 45°.

Figure 9A:
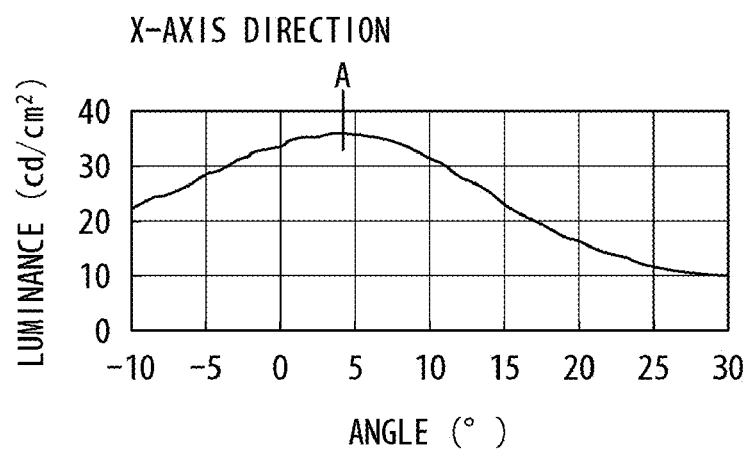
FIGS. 9A and 9B are diagrams showing the diffusion angle of the light diffusion sheet in Example 2.
Figure 9B:
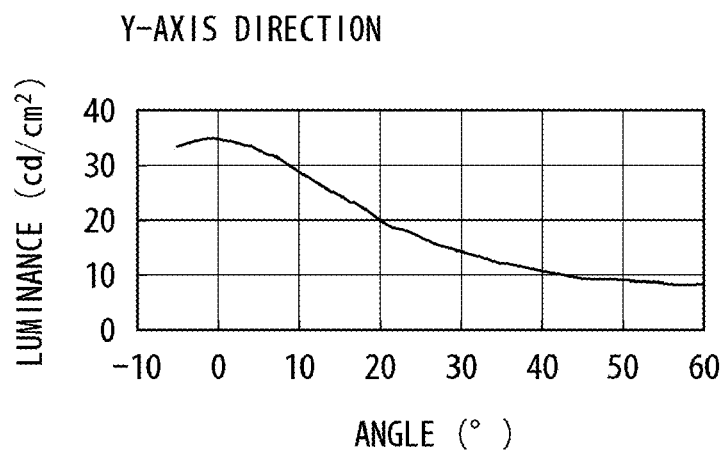

In the luminance distribution in the X-axis direction {FIG. 9(a)}, a luminance peak A axis-shifts from the angle (0°) in the direction perpendicular to the light diffusion sheet. This corresponds to the anisotropy (axis-shift) of the diffusion property in the present embodiment.

EXAMPLE 3

For determining the relationship between the angle (blast angle) between the blast gun and the mold base material and the anisotropy (axis-shift angle) of the diffusion property, molds for duplicating a light diffusion sheet were produced under substantially the same conditions as those in Example 1 except that the angle (blast angle) between the blast gun and the mold base material was changed stepwise from 2 to 90°. Then, light diffusion sheets were individually produced using the molds under the same conditions as those in Example 2, and each of the light diffusion sheets obtained was permitted to transmit collimated rays of light from the back surface of the sheet to measure the luminance distribution in the X-axis direction of the transmitted light from the front side of the sheet.

Figure 10:
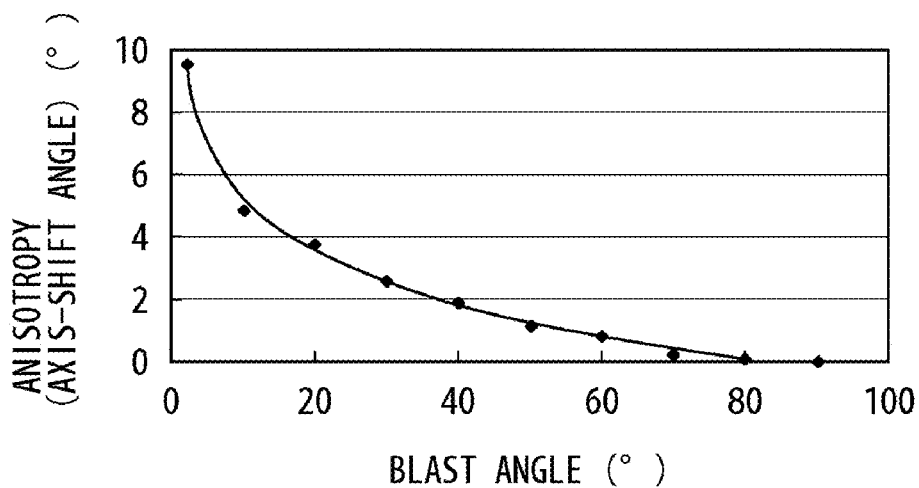
FIG. 10 is a diagram showing the relationship between the blast angle and the anisotropy (axis-shift angle) of the diffusion property of the light diffusion sheet in Example 3.

From the luminance distribution obtained, the relationship between the blast angle and the anisotropy (axis-shift angle) of the diffusion property was determined. The results are shown in Table 1 below and FIG. 10. Axis-shift at a predetermined angle in the blasting direction (the direction of $X_1$ in FIG. 1) could be realized by adjusting the blast angle.

TABLE 1

| Blast angle (°) | Anisotropy (axis-shift angle) (°) |
|---|---|
| 2 | 9.5 |
| 10 | 4.8 |
| 20 | 3.7 |
| 30 | 2.5 |
| 40 | 1.8 |
| 50 | 1.1 |
| 60 | 0.8 |
| 70 | 0.05 |
| 80 | 0 |
| 90 | 0 |

EXAMPLE 4

Next, a reflective screen was produced using the following coating composition H for optical film and coating composition L for optical film.

| (1) Coating composition H for optical film | |
|---|---|
| Fine particles: TiO$_2$ fine particles<br>(manufactured and sold by Ishihara Sangyo Kaisha Ltd.; average particle size: about 20 nm; refractive index: 2.48) | 100 Parts by weight (2.02 Wt %) |
| Dispersant: SO$_3$Na Group-containing molecule<br>(weight average molecular weight: 1,000; SO$_3$Na group concentration: 2 × 10$^{-3}$ mol/g) | 20 Parts by weight (0.40 Wt %) |
| Binder: Mixture of dipentaerythritol hexaacrylate and dipentaerythritol pentaacrylate<br>(UV curing resin, trade name: DPHA; manufactured and sold by Nippon Kayaku Co., Ltd.) | 30 Parts by weight (0.61 Wt %) |
| Organic solvent: Methyl isobutyl ketone (MIBK) | 4,800 Parts by weight (96.97 Wt %) |

First, the fine particles, dispersant, and organic solvent in respectively predetermined amounts were mixed together, and dispersed by mean of a paint shaker to obtain a TiO$_2$ fine-particle dispersion. Then, a binder was added to the dispersion and agitated by means of an agitator to prepare a coating composition H.

(2) Coating Composition L for Optical Film

Polymer of perfluorobutenyl vinyl ether having a carboxyl group at the terminal (trade name: CYTOP; manufactured and sold by Asahi Glass Co., Ltd.)

(3) Method for Producing a Reflective Screen (s11) The coating composition H is applied to both surfaces of a transparent substrate by a dipping method.

(s12) The films of the coating composition H are dried at 80° C., and then cured by irradiation of ultraviolet light (UV) (1,000 mJ/cm$^2$) to form optical films H each having a thickness of 780 nm and a refractive index of 1.94.

(s13) Then, the coating composition L is applied to each high refractive-index optical film H by a dipping method.

(s14) The films of the coating composition L are dried at 90° C. to form optical films L each having a thickness of 1,240 nm and a refractive index of 1.34.

(s15) The coating composition H is applied to each optical film L under the same conditions as those in the step s11.

(s16) The films of the coating composition H are formed under the same conditions as those in the step s12 to form optical films H each having a thickness of 780 nm and a refractive index of 1.94, thus obtaining optical multilayer films each including three layers, i.e., optical film H/optical film L/optical film H per one surface, that is, six layers in total on a transparent substrate.

(s17) The light diffusion sheet in Example 3 is stacked through an adhesive layer on the surface of one of the above optical multilayer films.

(s18) A black coating composition is applied to the surface of another of the optical multilayer films by a spraying method to form a black light-absorbing layer, thus obtaining a reflective screen.

Image light was projected to the reflective screen obtained to observe the image from the front of the screen. As a result, an image with uniform and high luminance could be seen at a specific site, confirming that the reflected image light was controlled to be directed to a specific field of view.

EXAMPLE 5

A mold for use in duplicating a light diffusion sheet was produced under the following conditions.

(1) Mold base material: Aluminum sheet (X: 200 mm×Y: 100 mm)

(2) Sandblasting conditions

Sandblaster {model: SGF-4 (A); manufactured and sold by Fuji Manufacturing Co., Ltd.)

Grit: Alumina (#220)

Distance between the blast gun and the mold base material: 50 mm

Angle between the blast gun and the mold base material: 10°

Compressed air pressure: 0.5 MPa

Blasting conditions of the abrasive material for the surface of the mold base material: Conditions shown in FIG. 4.

Blast gun scanning conditions: Scanned at a pitch of 5 mm in the X-direction and in the Y-direction as shown in FIG. 4.

Figure 11:
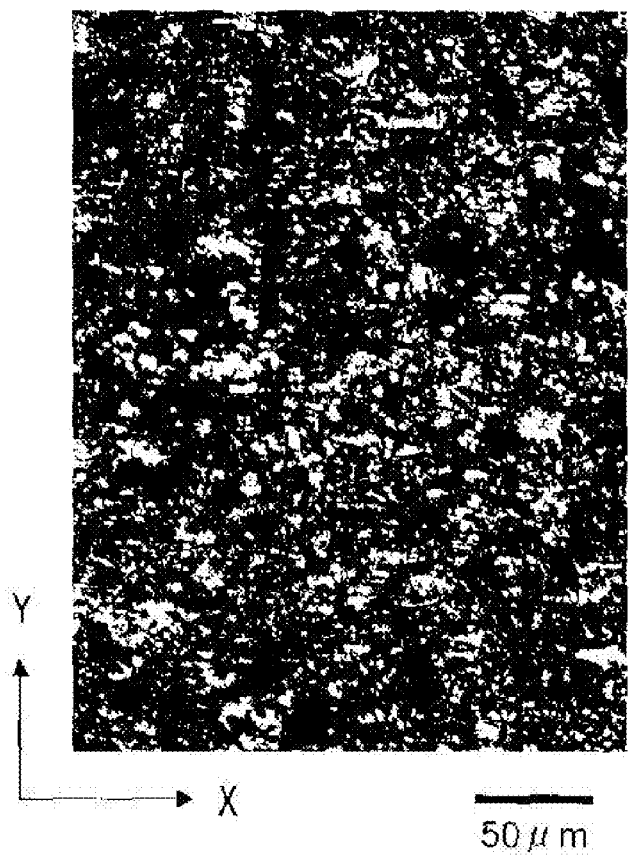
FIG. 11 is a photomicrograph showing the surface state of the mold for duplicating a light diffusion sheet in Example 5.

The surface state of the mold obtained is shown in FIG. 11. There was observed a state such that there was a difference in the roughness of the surface between the longitudinal direction and the lateral direction (the X-axis direction and the Y-axis direction) and the form of deformation (recess) in the X-axis direction is longer than that in the Y-axis direction.

Figure 13:
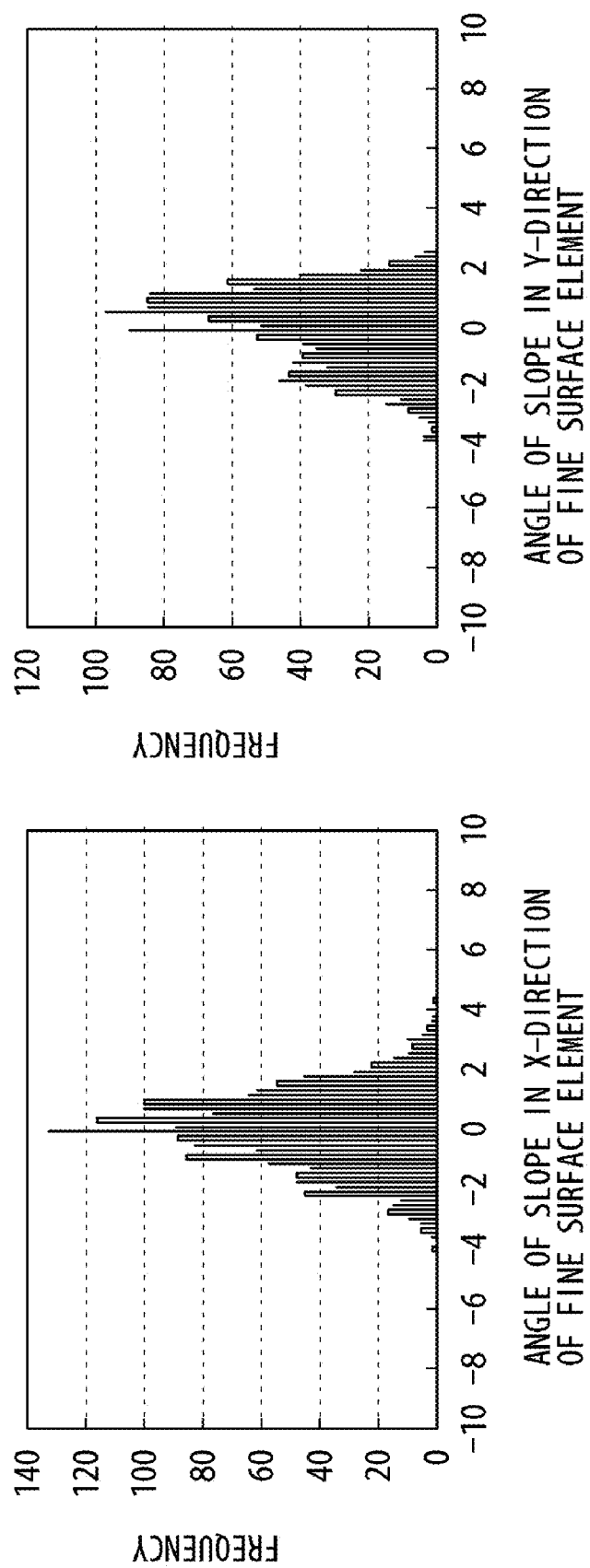
FIG. 13 is a diagram showing the frequency distributions with respect to the angle of slope of the fine surface element of the mold for duplicating a light diffusion sheet in Example 5.

Next, the results of the measurement of surface roughness of the mold using a stylus-type profile meter ET4000A (manufactured and sold by Kabushiki-kaisha Kosaka Laboratory) are shown in FIG. 12. A pitch Px of the surface roughness in the X-axis direction was longer than a pitch Py of the surface roughness in the Y-axis direction, and an average unevenness gap Sm was as follows: X-axis direction: S=90 μm; and Y-axis direction: S=45 μm. In addition, it has been found that the form of the lowered portion in the Y-axis direction is symmetrical, but the form of the lowered portion in the X-axis direction is asymmetrical. Histograms of the angles of slope in the X- and Y-directions of the fine surface element based on the form of the cross-section in FIG. 12 are shown in FIG. 13. It has been found that the distribution of the angle of slope of the cross-section in the X-direction is such symmetrical that it is close to a Gaussian distribution, but the distribution of the angle of slope of the cross-section in the Y-direction has two peaks on both the positive and negative sides and the form of the distribution is asymmetrical (which is not a Gaussian distribution).

Next, as a substrate having a width sufficient to form a large-size light diffusion sheet having a high light transmittance, a PET film (thickness: 100 μm) was prepared. Then, an urethane acrylic resin having a refractive index of 1.53 was applied to the mold, and covered with the PET film having a thickness of 100 μm while preventing the resin from containing air bubbles, and then pressed by means of a rubber roller while adjusting the pressure of the rubber roller so that the thickness of the resin became uniform and 50 μm. Subsequently, the resin was irradiated from the side of the PET film with ultraviolet light at the integrated quantity of light of 1,000 mJ, which is sufficient to polymerize and cure the resin, and then removed from the mold, together with the substrate, to transfer the surface form of the mold to the resin, thus producing a light diffusion sheet.

For examining the diffusing power of the thus produced light diffusion sheet, an aluminum reflective sheet was stacked on the back surface of the light diffusion sheet obtained to produce a reflective screen, and the front surface of the screen was illuminated collimated rays of light using a gonio-photometer (manufactured and sold by OPTEC CO., LTD.) while changing the angle in the X-direction and Y-direction to measure a reflected light strength profile. The results are shown in FIG. 14.

The angle (half band width) in the X-direction at which the reflection strength is half of the maximum strength was 25°, and that in the Y-direction was 37°. Reflecting the surface form of the mold shown in FIGS. 12 and 13, the maximum luminance angle in the Y-direction is 0° and hence the diffusion property is symmetrical, but the maximum luminance angle in the X-direction is 2°, that is, the maximum luminance is at an angle to the normal direction (direction of the normal with respect to the principal surface of the light diffusion sheet), and the ratio between the angles at which the diffused light strength is half is 1.1:1 and thus asymmetrical with respect to the maximum luminance axis (axis directed from the origin to the maximum luminance peak), indicating that more light is diffused in the direction of the maximum luminance axis.

Next, an aluminum reflective sheet was stacked on the back surface of a light diffusion sheet of related art, in which the maximum luminance is in the normal direction and the diffusion property is symmetrical with respect to the maximum luminance axis, to produce a reflective screen for comparison. This screen and the reflective screen in the present Example were disposed side by side, and image light was projected to each screen to observe the image from the front side of the screen. As a result, in the screen for comparison, the image on the middle portion of the screen was bright, but the image on the periphery portion was dim. By contrast, in the reflective screen in the present Example, a bright image having a high luminance could be obtained. Further, by disposing the reflective screen upside down, the reflective screen in the present Example could be used in both the forward and downward projection at an angle from a projector fitted to a ceiling and the forward and upward projection at an angle from a projector placed on a desk.

EXAMPLE 6

An urethane acrylic resin having a refractive index of 1.53 was applied to a mold, which is the same mold for copying the light diffusion sheet as in the Example 5. Subsequently, the mold is covered with a PET film. The PET film serves as a supporting member, has a thickness of 100 μm and a high transparent ratio in violet light region, and one side of which is subjected to easy-adhesion treatment. The mold is covered with the PET film in such a way that the other side of surface of the PET film, in which no easy-adhesion treatment is performed, faces to the mold surface while preventing the resin from containing air bubbles, and then pressed by means of a rubber roller while adjusting the pressure of the rubber roller so that the thickness of the resin became uniform and 100 μm. Subsequently, the resin was irradiated from the side of the PET film with ultraviolet light at the integrated quantity of light of 1,000 mJ, which is sufficient to polymerize and cure the resin, to produce a sheet of the resin. After the supporting member (PET film) is removed, the resin sheet is removed from the mold, thereby completing the copying of a light diffusion sheet to which the surface structure of the mold is transferred.

For examining the diffusing power of the thus produced light diffusion sheet, an aluminum reflective sheet was stacked on the back surface of the light diffusion sheet obtained to produce a reflective screen, and the front surface of the screen was illuminated with collimated rays of light using a gonio-photometer (manufactured and sold by OPTEC CO., LTD.) while changing the light incident angle in the X-direction and Y-direction to measure a reflected light strength profile.

In the result, the angle (half band width) in the X-direction at which the reflection strength is half of the maximum strength was 25°, and that in the Y-direction was 37°. The maximum luminance angle in the X-direction is 2°, that is, the maximum luminance is inclined to the normal direction (direction of the normal with respect to the principal surface of the light diffusion sheet). Accordingly, in the present example, the similar performance is obtained as in the Example 5. Furthermore, according to the present example, it was possible to obtain a bright image with a high luminance similarly as in the Example 5 when image light is projected on the screen and monitored near the front of the screen. Furthermore, in the present example, it was possible to appropriately adjust the reflective screen in both cases of setting environment, which include a case of projecting slant downward when placing a projector on a ceiling and a case of projecting slant upward when placing a projector on a desk, by turning the setting direction of the reflective screen upside down.

EXAMPLE 7

A light diffusion sheet was produced according to the following procedure.

(S21) An urethane acrylic resin having a refractive index of 1.53 was applied to the surface of the mold produced in Example 5, and covered with a polyethylene terephthalate film having a thickness of 100 μm while preventing the resin from containing air bubbles, and then pressed by means of a rubber roller while adjusting the pressure of the rubber roller so that the thickness of the resin became uniform and 50 μm. Subsequently, the resin was irradiated from the side of the PET film with ultraviolet light at the integrated quantity of light of 1,000 mJ, which is sufficient to polymerize and cure the resin, and then removed from the mold, together with the substrate, to transfer the surface form of the mold to the resin, thus producing a light diffusion sheet A.

(S22) Further, a fluorine acrylic resin having a refractive index of 1.38 was applied to the same mold, and covered with the light diffusion sheet A produced in the above step, and then pressed by means of a rubber roller while adjusting the pressure of the rubber roller so that the thickness of the resin became uniform and 30 μm. Subsequently, the resin was irradiated from the side of the PET film with ultraviolet light at the integrated quantity of light of 1,000 mJ, which is sufficient to polymerize and cure the resin, and then removed from the mold, together with the substrate, to transfer the surface form of the mold to the resin.

(S23) Further, the steps S21 and S22 were repeated to produce a light diffusion sheet including four layers respectively having refractive indexes of 1.53, 1.38, 1.53, and 1.38 in this order from the side of the PET film.

Figure 15A:
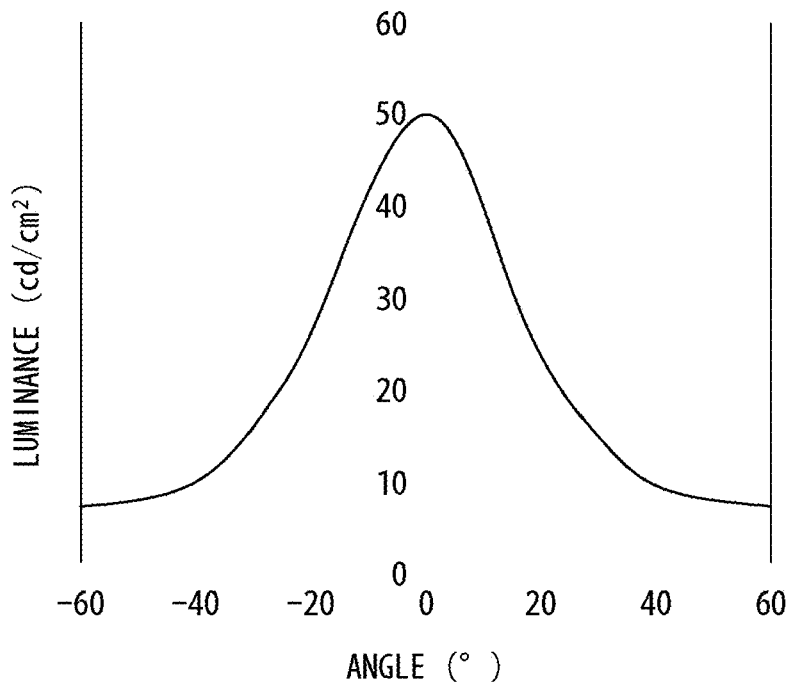
FIGS. 15A and 15B are diagrams showing the luminance distribution of the light diffusion sheet in Example 7.
Figure 15B:
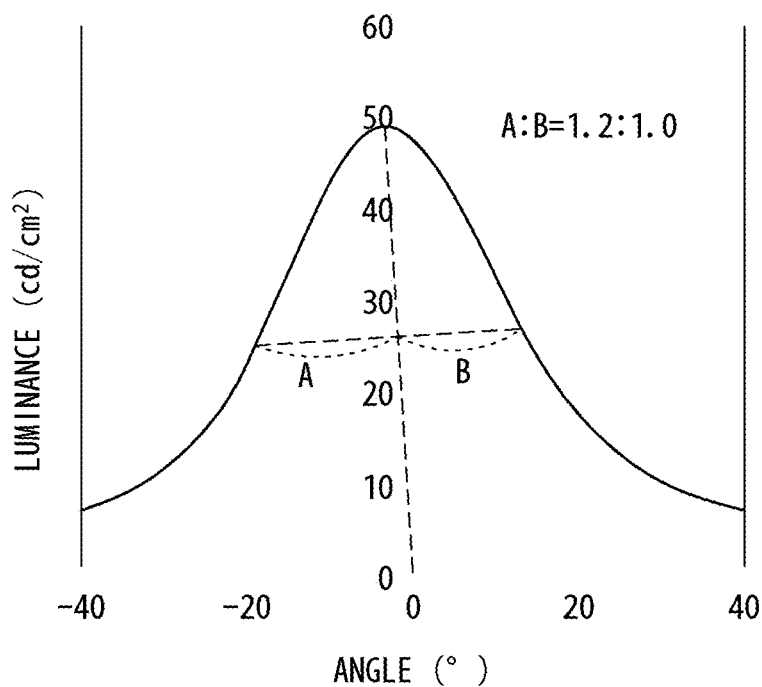

For examining the diffusing power of the thus produced light diffusion sheet, an aluminum reflective sheet was stacked on the back surface of the light diffusion sheet obtained, and the front surface of the light diffusion sheet was illuminated collimated rays of light using a goniophotometer (manufactured and sold by OPTEC CO., LTD.) while changing the angle in the X-direction and Y-direction to measure a reflected light strength profile. The results are shown in FIG. 15.

The maximum luminance angle in the Y-direction is 0° and hence the diffusion property is symmetrical, but the maximum luminance angle in the X-direction is 2.5°, that is, the maximum luminance is angled to the normal direction, and the ratio between the angles at which the diffused light strength is half is 1.2:1 and thus asymmetrical with respect to the maximum luminance axis, indicating that more light is diffused in the direction of the maximum luminance axis.

EXAMPLE 8

Instead of the aluminum flat sheet, an aluminum roll having a diameter of 20 cm was subjected to sandblasting under the same conditions as those in Example 1, and an urethane acrylic resin having a refractive index of 1.53 was applied to the mold using a roll-to-roll continuous film-forming machine while being covered with a polyethylene terephthalate having a thickness of 100 μm, and the resin was irradiated from the side of the polyethylene terephthalate with ultraviolet light at the integrated quantity of light of 1,000 mJ, which is sufficient to cure the resin, and then removed from the mold to produce a light diffusion sheet.

Figure 16A:
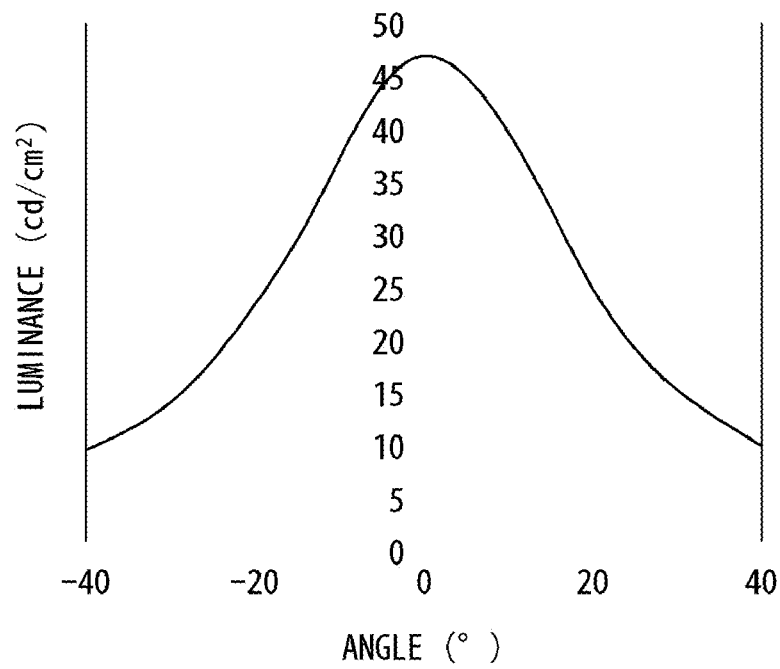
FIGS. 16A and 16B are diagrams showing the luminance distribution of the light diffusion sheet in Example 8.
Figure 16B:
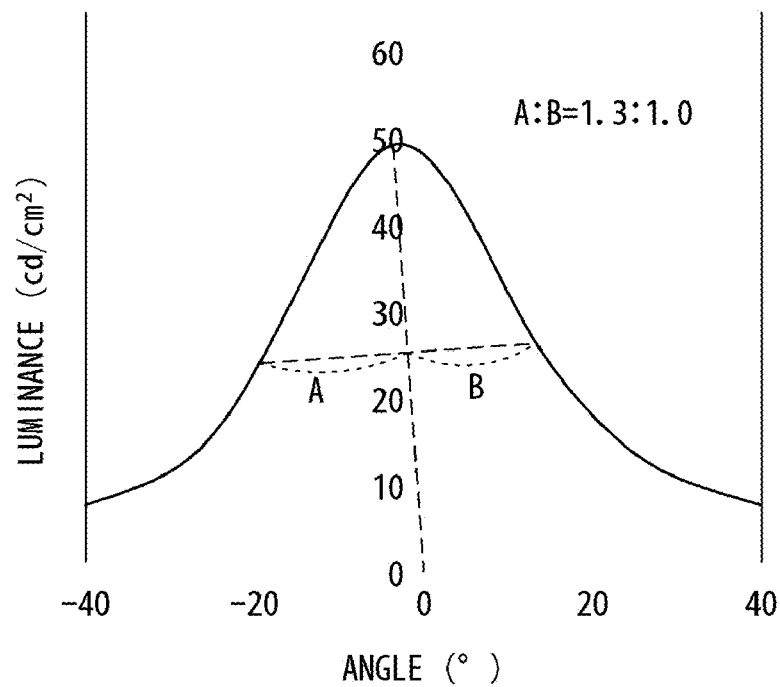
Figure 17A:
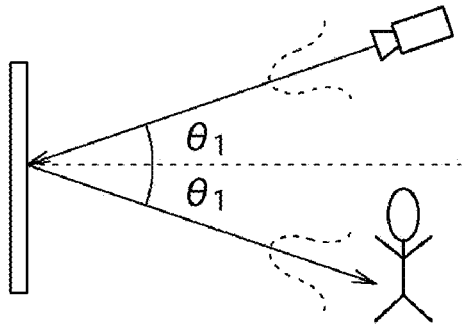
FIGS. 17A and 17B are explanatory views for luminance distribution of a reflective screen of related art.
Figure 17B:
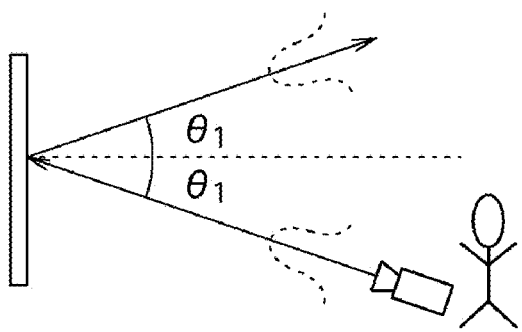
Figure 18:
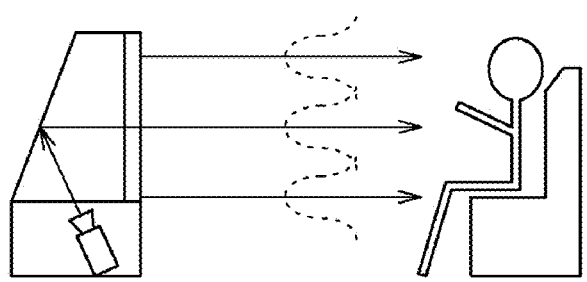
FIG. 18 is an explanatory view for luminance distribution of a transmissive screen of related art.

For examining the diffusing power of the thus produced light diffusion sheet, an aluminum reflective sheet was stacked on the back surface of the light diffusion sheet obtained, and the front surface of the light diffusion sheet was illuminated collimated rays of light using a goniophotometer (manufactured and sold by Kabushiki-kaisha OPTEC) while changing the angle in the X-direction and Y-direction to measure a reflected light strength profile. The results are shown in FIG. 16. The maximum luminance angle in the Y-direction is 0° and hence the diffusion property is symmetrical, but the maximum luminance angle in the X-direction is 3.8°, that is, the maximum luminance is angled to the normal direction, and the ratio between the angles at which the diffused light strength is half is 1.3:1 and thus asymmetrical with respect to the maximum luminance axis, indicating that more light is diffused in the direction of the maximum luminance axis.

Next, an aluminum reflective sheet was stacked on the back surface of a light diffusion sheet of related art, in which the maximum luminance is in the normal direction and the diffusion property is symmetrical with respect to the maximum luminance axis, to produce a reflective screen for comparison. This screen and the reflective screen in the present Example were disposed side by side, and image light was projected to each screen to observe the image from the front side of the screen. As a result, in the screen for comparison, the image on the middle portion of the screen was bright, but the image on the periphery portion was dim. By contrast, in the reflective screen in the present Example, a bright image having a high luminance could be obtained. Further, by disposing the reflective screen upside down, the reflective screen in the present Example could be used in both the forward and downward projection at an angle from a projector fitted to a ceiling and the forward and upward projection at an angle from a projector placed on a desk.

EXAMPLE 9

As a light diffusion sheet, using the light diffusion sheets in Examples 5 and 8 and the light diffusion sheets of the present embodiment respectively having degrees of asymmetry of 1.5 and 2.0 with respect to the maximum luminance axis, an aluminum reflective sheet was stacked on the back surface of the individual light diffusion sheets to produce reflective screens. In addition, using a light diffusion sheet having isotropic diffusion property (trade name: 125PW; manufactured and sold by Kabushiki-Kaisha Kimoto) and a light diffusion sheet having symmetrical, anisotropic diffusion property (trade name: LSD60*25; manufactured and sold by POC), an aluminum reflective sheet was similarly stacked on the back surface of the individual light diffusion sheets to produce reflective screens for comparison.

Using these reflective screens, a gain (luminance relative to the luminance obtained using a perfect diffuser) was measured in the forward and downward projection at an angle from a projector fitted to a ceiling with respect to each of the images on the upper, lower, and middle parts of the screen, and the results are shown in Table 2 below. In this instance, the asymmetrical light diffusion sheets in the Examples were disposed so that the side having larger light converging power faced upward. The measurement was made under conditions wherein the projector was positioned at a distance of 5 m from the screen so that specular reflection occurred at the center of the screen.

TABLE 2

|  | Light diffusion sheet | Degree of asymmetry | Axis-shift angle (°) | Gain Upper part of Screen A | Gain Middle of screen B | Gain Lower part of screen C | B-A | B-C |
|---|---|---|---|---|---|---|---|---|
| Example 8-1 | Example 5 (asymmetrical) | 1.0 | 0.0 | 3.7 | 4.3 | 3.9 | 0.6 | 0.4 |
| Example 8-2 | Example 7 (asymmetrical) | 1.0 | 0.0 | 3.5 | 4.1 | 3.8 | 0.6 | 0.3 |
| Example 8-3 | Asymmetrical diffusion A | 1.1 | 2.2 | 3.3 | 3.9 | 3.9 | 0.6 | 0 |
| Example 8-4 | Asymmetrical diffusion B | 1.3 | 3.6 | 2.9 | 3.6 | 3.6 | 0.7 | 0 |
| Comparative Example 8-1 | Isotropic diffusion | 1.5 | 3.9 | 1.0 | 1.0 | 1.0 | 0 | 0 |
| Comparative Example 8-2 | Symmetrical, anisotropic diffusion | 2.0 | 2.9 | 4.0 | 4.8 | 4.0 | 0.8 | 0.8 |

When using the asymmetrical light diffusion sheet of the present embodiment, the difference between the gain at the middle of the screen and the gain at the upper part and/or lower part of the screen was smaller than that in Comparative Example 9-2, which indicates that the uniformity of luminance was improved. This effect was remarkable especially in the screen having a large size.

The light diffusion sheet in the present Example was joined to a transparent resin substrate including polymethyl methacrylate having a thickness of 2 mm so that the sheet had rigidity to produce a transmissive screen. In a display using this transmissive screen, it has been found that the uniformity of luminance is improved like the reflective screen.

EXAMPLE 10

The surface of an aluminum sheet was processed by sandblasting in the same manner as in Example 1 to produce a mold for duplicating a light diffusion sheet, and light diffusion sheets were produced from an ultraviolet curing resin using the mold. In this instance, in the sandblasting conditions used for producing the mold, the particle size of the abrasive material, the power, and the blast angle were changed so that the pitch of surface roughness in the X-direction of the mold became 90 to 420 μm.

The light diffusion sheets produced were used in an image display, and an image was observed at a distance suitable for observing the image light to evaluate the recognizability. The recognizability was evaluated in accordance with the following three criteria: a sharp and clear image was obtained (symbol: ○); the resolution is satisfactory, but the screen has glaring (symbol: Δ); and the resolution is poor and the glaring is marked (symbol: x).

The results are shown in Table 3 below. In the observation at a distance as small as the pitch of roughness of the light diffusion sheet can be recognized, the glaring was intense and the image was not sharp. Especially when the luminance of the image light was high, the glaring was considerably marked.

TABLE 3

| Pitch of surface roughness | Sheet size | Distance for observation | Recognizability |
|---|---|---|---|
| 90 μm | 30 in | 60 cm | ○ |
| 90 μm | 40 in | 120 cm | ○ |
| 180 μm | 30 in | 60 cm | Δ |
| 180 μm | 40 in | 120 cm | ○ |
| 180 μm | 60 in | 200 cm | ○ |
| 260 μm | 30 in | 60 cm | X |
| 260 μm | 40 in | 120 cm | Δ |
| 260 μm | 60 in | 200 cm | ○ |
| 420 μm | 40 in | 120 cm | X |
| 420 μm | 60 in | 200 cm | Δ |
| 420 μm | 60 in | 500 cm | ○ |

The relationship between the visual acuity and the resolution of a viewer is represented by the following formula:

$$\text{Resolution } (dpi) = 2.54 \times 3{,}438 \times (\text{Visual acuity})/(\text{Distance for observation}) \text{ (cm)}$$

Specifically, when a viewer having a visual acuity of 1.0 observes an image at a distance of 60 cm, the viewer can recognize 146 dpi (pitch: 173 μm), and, when the viewer observes an image at a distance of 200 cm, the viewer can recognize 44 dpi (pitch: 577 μm). Therefore, the appropriate surface roughness varies depending on the distance for observation from the light diffusion sheet used and the visual acuity of a viewer, but, considering the observation at a distance of about 100 to 200 cm, it is desired that the surface roughness (unevenness pitch) is 300 μm or less.

It should be understood by those skilled in the art that various modifications, combinations, sub-combinations and alterations may occur depending on design requirements and other factors insofar as they are within the scope of the appended claims or the equivalents thereof.

What is claimed is:

1. A method of producing a mold for use in duplicating a light diffusion sheet, the method comprising:
    conducting sandblasting which blasts abrasive material from a blast gun to a surface of a mold base material to form unevenness in the surface of the mold base material,
    wherein,
        the sandblasting is conducted such that an angle between the surface of the mold base material and the blast gun is within a range of 0 to 60°, and
        a resulting pitch of the surface roughness in the lateral direction is longer than a pitch of the surface roughness in the longitudinal direction.

2. A method of producing a mold for use in duplicating a light diffusion sheet according to claim 1, wherein
    the sandblasting is conducted such that the angle between the surface of the mold base material and the blast gun is within a range of 0 to 20°.

3. A method of producing a light diffusion sheet, the method including the step of:
    duplicating a light diffusion sheet using a mold,
    wherein,
        the mold is produced by conducting sandblasting which blasts abrasive material from a blast gun to the surface of a mold base material to form unevenness in the surface of the mold base material,
        the abrasive material is blasted from the blast gun to the surface of the mold base material such that an angle between the surface of the mold base material and the blast gun is within a range of 0 to 60°, and
        a resulting pitch of the surface roughness in the lateral direction is longer than a pitch of the surface roughness in the longitudinal direction.

4. The method of producing a light diffusion sheet according to claim 3, wherein
    the abrasive material is blasted from the blast gun to the surface of the mold base material such that the angle between the surface of the mold base material and the blast gun is within a range of 0 to 20°.

* * * * *